United States Patent
Koide et al.

(10) Patent No.: US 9,651,841 B2
(45) Date of Patent: May 16, 2017

(54) DISPLAY DEVICE

(71) Applicant: Japan Display Inc., Minato-ku (JP)

(72) Inventors: Gen Koide, Tokyo (JP); Toshiaki Fukushima, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 15/067,611

(22) Filed: Mar. 11, 2016

(65) Prior Publication Data

US 2016/0266451 A1    Sep. 15, 2016

(30) Foreign Application Priority Data

Mar. 13, 2015   (JP) .................................. 2015-050405

(51) Int. Cl.
*G02F 1/1343* (2006.01)
*G02F 1/1362* (2006.01)

(52) U.S. Cl.
CPC .................. *G02F 1/136286* (2013.01); *G02F 2001/136218* (2013.01)

(58) Field of Classification Search
CPC ... H01L 27/3276; H01L 27/124; H01L 51/50; H01L 21/67; H01L 2251/5315; H01L 27/12; H01L 27/1248; H01L 27/1266; H01L 27/1288; H01L 27/322; H01L 27/326; H01L 33/08; H01L 51/001; H01L 51/0058
USPC .................................. 257/40, 59, 88; 438/99
See application file for complete search history.

(56) References Cited

U.S. PATENT DOCUMENTS

| 7,982,813 | B2 * | 7/2011 | Kim | .................. G02F 1/136204 257/59 |
| 8,537,296 | B2 * | 9/2013 | Kim | .................. G02F 1/136213 349/138 |
| 9,099,683 | B2 * | 8/2015 | Omoto | .................. H01L 27/322 |
| 2007/0257602 | A1 * | 11/2007 | Miyagi | ................ G09G 3/3233 313/503 |
| 2013/0302937 | A1 * | 11/2013 | Jinbo | ...................... H01L 51/50 438/99 |
| 2014/0014912 | A1 * | 1/2014 | Kim | .................... H01L 27/3276 257/40 |

FOREIGN PATENT DOCUMENTS

JP      2010-107840      5/2010

* cited by examiner

*Primary Examiner* — William F Kraig
*Assistant Examiner* — Edward Chin
(74) *Attorney, Agent, or Firm* — Oblon, McClelland, Maier & Neustadt, L.L.P.

(57) ABSTRACT

To reduce the area of a portion where a plurality of transistors are provided in a region around a display region and to reduce the area of the region around the display region, a display device includes a first transistor and a second transistor each as a transistor, and the transistor includes a connection wiring that electrically connects a semiconductor film and a source-drain electrode to each other via an opening portion provided in an insulating film. The first transistor and the second transistor are adjacent to each other, and there is a clearance between an end portion, on the side of the second transistor, of the connection wiring in the first transistor and an end portion, on the side of the second transistor, of the opening portion in the first transistor.

18 Claims, 17 Drawing Sheets

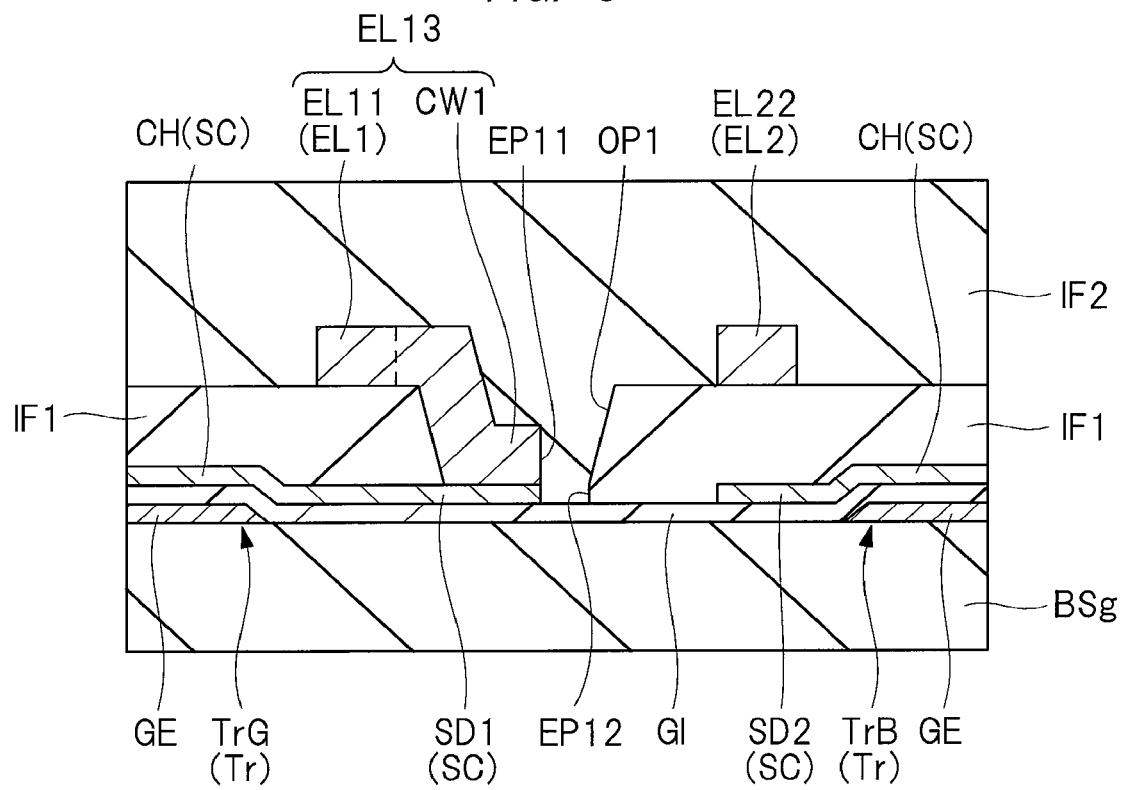
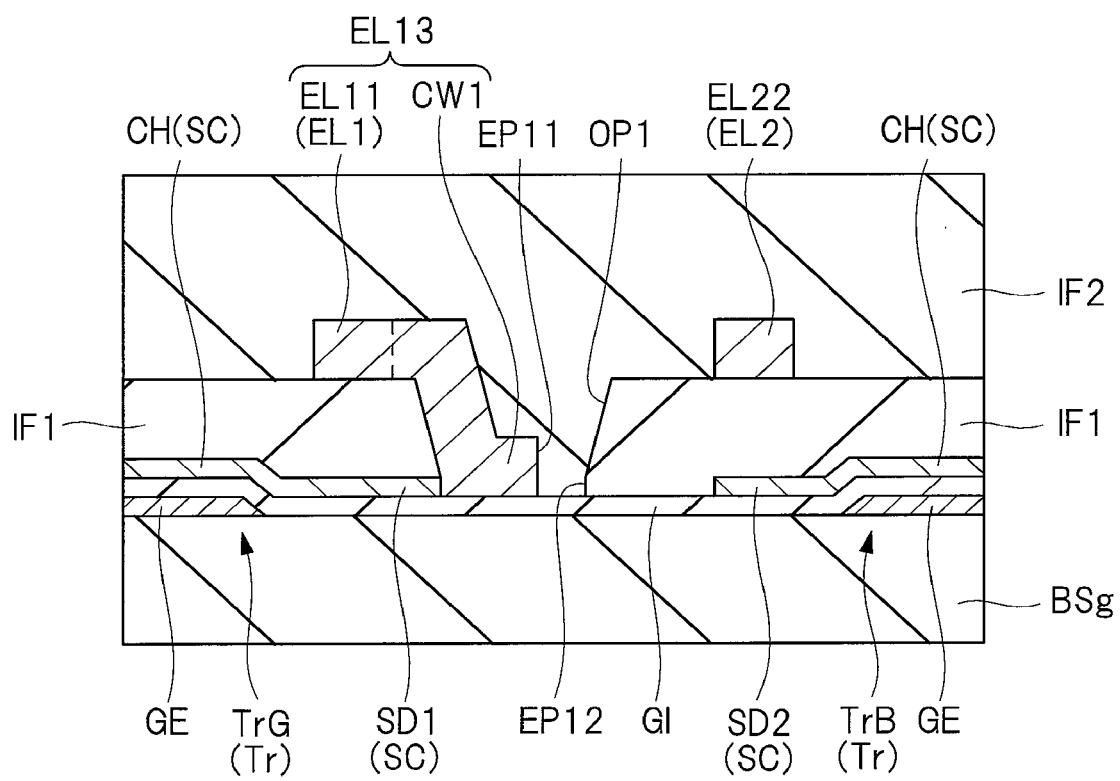

DISPLAY DEVICE

CROSS-REFERENCE TO RELATED APPLICATION

The present application claims priority from Japanese Patent Application No. 2015-050405 filed on Mar. 13, 2016, the content of which is hereby incorporated by reference into this application.

TECHNICAL FIELD OF THE INVENTION

The present invention relates to a display device, and to technique effectively applied to a display device including a transistor for feeding a signal to a plurality of pixels provided in a display region, for example.

BACKGROUND OF THE INVENTION

A display device, which feeds a signal to a plurality of pixels provided in a display region via a plurality of signal lines and displays an image, has been known. In this display device, the area of a region around the display region is required to be reduced to miniaturize the display device and enlarge the display region.

Each of the plurality of pixels includes a plurality of sub-pixels respectively representing colors, i.e., red (R), green (G), and blue (B). A signal line, via which a video signal is fed to each of the pixels, includes a plurality of signal lines respectively connected to the plurality of sub-pixels included in the pixel. The signal lines respectively connect a signal line driving circuit to which the video signals are input and the sub-pixels. A signal line switch circuit is connected between the signal line driving circuit and each of the signal lines.

For example, Japanese Patent Application Laid-Open Publication No. 2010-107840 (Patent Document 1) discusses technique in which a display device includes on a substrate a display region where a plurality of pixel circuits are arranged in a matrix form and a plurality of switch circuits that are controlled to be rendered conductive and non-conductive in response to a control signal and respectively feed video signals to the pixel circuits.

SUMMARY OF THE INVENTION

The signal line switch circuit includes a plurality of transistors that respectively connect the plurality of signal lines to signal line driving circuit. The plurality of transistors included in the signal line switch circuit are provided in a region around a display region. A relatively large current flows in the plurality of transistors. Thus, the gate width of the transistor is larger than the gate length thereof. To efficiently arrange the plurality of transistors the gate width of which is larger than the gate length thereof, the plurality of transistors are arranged in a gate length direction.

However, a distance between respective source electrodes or drain electrodes adjacent to each other in the two transistors adjacent to each other in the gate length direction is difficult to reduce. Therefore, the plurality of transistors including the transistors and arranged in the gate length direction cannot be closely arranged as a whole, and the area of the region around the display region cannot be reduced.

Alternatively, if a plurality of transistors other than the transistors included in the signal line switch circuit are provided in the region around the display region, the area of the region around the display region can be reduced, like the transistors included in the signal line switch circuit.

The present invention has been made to solve the above described problems in a conventional technique, and is directed to providing a display device capable of reducing the area of a portion where a plurality of transistors are provided in a region around a display region and reducing the area of the region around the display region.

The typical ones of the inventions disclosed in the present application will be briefly described as follows.

According to an aspect of the present invention, a display device includes a substrate, a pixel circuit having pixels formed therein, a plurality of control circuits that respectively feed signals relating to an image to the pixel circuit, and a transistor provided in a control circuit. The transistor includes a gate line extending in a first direction, an insulating film provided with an opening portion, a drain electrode and a source electrode arranged in a second direction different from the first direction, and a semiconductor film overlapped with the drain electrode, the source electrode, and the gate line with the insulating film interposed therebetween. The transistor includes a conductive wiring that electrically connects the semiconductor film and the source electrode or the drain electrode via the opening portion. The display device further includes a first transistor as a transistor and a second transistor as a transistor. The first transistor and the second transistor are adjacent to each other in the second direction, and there is a clearance between an end, on the side of the second transistor, of the conductive wiring in the first transistor and an end, on the side of the second transistor, of the opening portion in the first transistor.

In the one aspect, the first transistor may include a first opening portion group of a plurality of opening portions arranged on the side closer to the second transistor than the gate line of the first transistor, and the second transistor may include a second opening portion group of a plurality of opening portions arranged on the side closer to the first transistor than the gate line of the second transistor. The first opening portion groups are arranged in the first direction in the first transistor, and the second opening portion groups are arranged in the first direction in the second transistor. The first opening portion groups and the second opening portion groups may be alternately arranged in the first direction.

In the one aspect, one of the source electrode and the drain electrode in the first transistor and one of the source electrode and the drain electrode in the second transistor may be adjacent to each other in the second direction, and may not overlap each other in the first direction.

In the one aspect, the first transistor may include a first opening portion group of a plurality of opening portions arranged on the side closer to the second transistor than the gate line of the first transistor, and the second transistor may include a second opening portion group of a plurality of opening portions arranged on the side closer to the first transistor than the gate line of the second transistor. The first opening portion groups may be arranged in the first direction in the first transistor, the second opening portion groups may be arranged in the first direction in the second transistor, and the first opening portion groups and the second opening portion groups may overlap each other in the first direction.

In the one aspect, the pixel may include a first sub-pixel and a second sub-pixel respectively having different colors, the first transistor may be a transistor that drives the first sub-pixel, the second transistor may be a transistor that drives the second sub-pixel, and the first sub-pixel and the second sub-pixel may be arranged in the second direction.

In the one aspect, the pixel circuit may have a first pixel and a second pixel as the pixel formed therein, the first pixel may include a first sub-pixel, and the second pixel may include a second sub-pixel. The first transistor may be a transistor that drives the first sub-pixel, the second transistor may be a transistor that drives the second sub-pixel, the first sub-pixel and the second sub-pixel may respectively have different colors, and the first transistor and the second transistor may be controlled by the same control circuit.

In the one aspect, the display device may include a third transistor as the transistor, and the third transistor may be arranged on the opposite side to the second transistor with the first transistor sandwiched therebetween. The drain electrode in the first transistor and one of the source electrode and the drain electrode in the second transistor may be adjacent to each other in the second direction, and a source electrode in the third transistor may be shared with the source electrode in the first transistor.

In the one aspect, the first transistor may include a first opening portion group of the plurality of opening portions arranged on the side closer to the second transistor than the gate line of the first transistor, and the second transistor may include a second opening portion group of the plurality of opening portions arranged on the side closer to the first transistor than the gate line of the second transistor. The first transistor and the third transistor may have a common third opening portion group of the plurality of opening portions arranged between the gate line in the first transistor and the gate line in the third transistor. The first opening portion groups may be arranged in the first direction in the first transistor, the second opening portion groups may be arranged in the first direction in the second transistor, the first opening portion groups and the second opening portion groups may be alternately arranged in the first direction, and the third opening portion groups may be arranged in the first direction.

In the one aspect, one of the drain electrode and the source electrode in the first transistor and one of the drain electrode and the source electrode in the second transistor may be adjacent to each other, and the first transistor may have a plurality of opening portions arranged on the side of the second transistor with respect to the gate line in the first transistor. The opening portions in the first transistor and the drain electrode or the source electrode in the second transistor may be spaced apart from each other in a plan view.

BRIEF DESCRIPTIONS OF THE DRAWINGS

FIG. 8 is a cross-sectional view of transistors in a signal line switch circuit in the display device according to the embodiment;

FIG. 9 is a cross-sectional view of transistors in a signal line switch circuit in the display device according to the embodiment;

DESCRIPTIONS OF THE PREFERRED EMBODIMENTS

Figure 1:
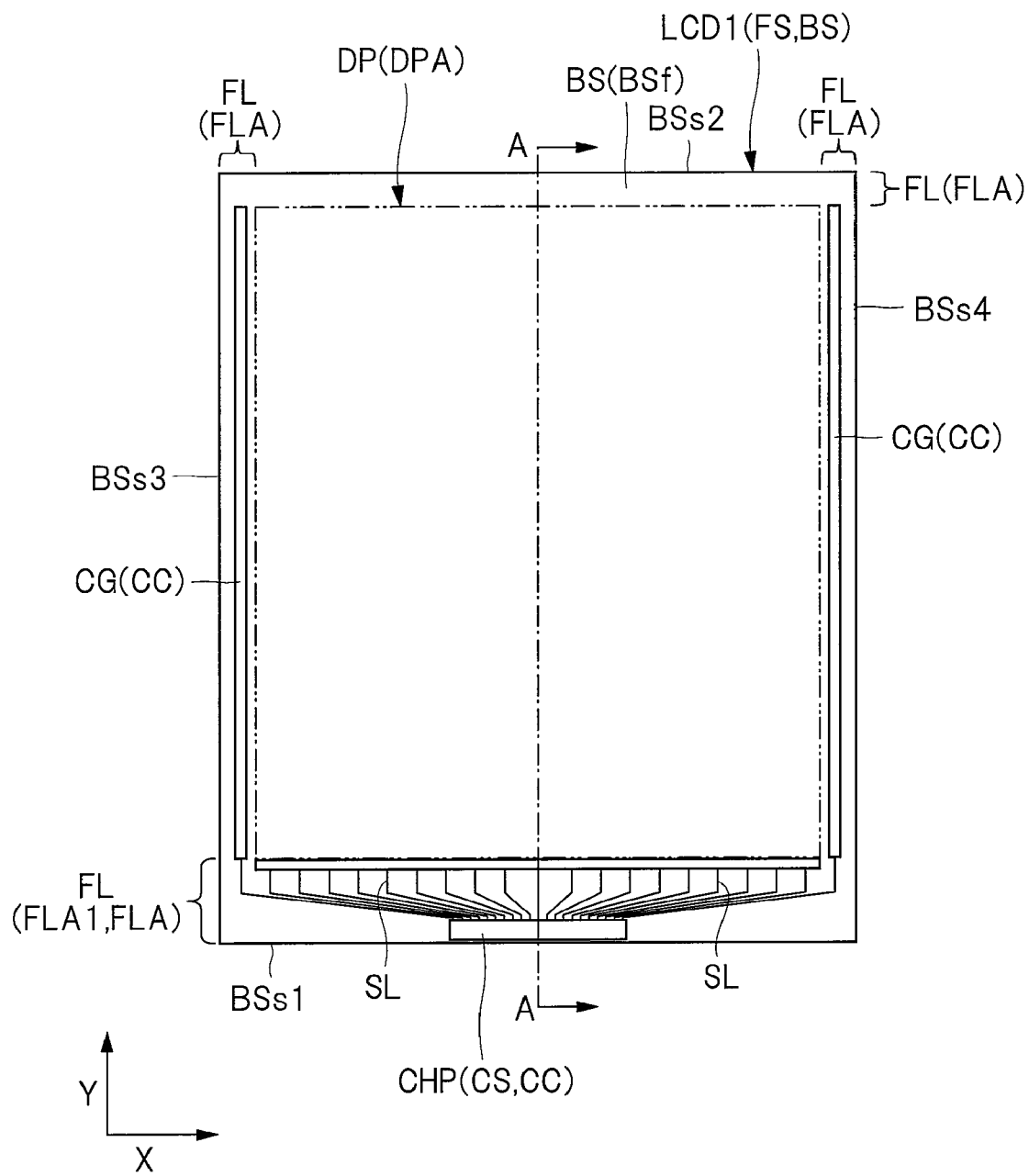
FIG. 1 is a plan view illustrating an example of a display device according to an embodiment.

Hereinafter, each embodiment of the present invention will be described in detail with reference to the accompanying drawings.

Note that disclosure is merely one example, and appropriate change with keeping the concept of the present invention which can be easily thought up by those who skilled in the art is obviously contained in the scope of the present invention. Also, in order to make the clear description, the drawings are illustrated more schematically for a width, a thickness, a shape, and others of each portion than those in an actual aspect in some cases. However, they are merely examples, and do not restrict the interpretation of the present invention.

In the specification and the drawings, similar elements to those described with reference to the existing drawings may be assigned the same signs, to omit detailed description thereof, as needed. In description of a structure of a display device in the present specification, "upper" indicates the side on which a transistor Tr and a control circuit (a signal line switch circuit SW) are formed with respect to a substrate BS, and "lower" indicates the opposite side to "upper".

Further, in drawings used in the embodiments, hatching is omitted even in a cross-sectional view so as to make the drawings easy to see. Also, hatching is used even in a plan view so as to make the drawings easy to see.

Technique described below in the embodiment is widely applicable to a display device including a mechanism for feeding a signal to a plurality of elements provided in a display region provided with a display functional layer from around the display region. Examples of the above described display device can include various display devices such as a liquid crystal display and an organic electro-luminescence (EL) display device. In the embodiment, described below, the liquid crystal display will be described as a typical example of the display device.

The liquid crystal display is roughly classified into two categories, described below, depending on an application direction of an electric field for changing an orientation of liquid crystal molecules of a liquid crystal layer as a display functional layer. That is, the first category includes a so-called vertical electric field mode in which an electric field is applied in a thickness direction (or an out-of-plane direction) of the display device. Examples of the vertical electric field mode include a Twisted Nematic (TN) mode and a Vertical Alignment (VA) mode. The second category includes a so-called horizontal electric field mode in which an electric field is applied to a plane direction (or an in-plane direction) of the display device. Examples of the horizontal electric field mode include an In-Plane Switching (IPS) mode and a Fringe Field Switching (FFS) mode as one type of the IPS mode. The above described vertical electric field mode includes a case where an electric field is generated in an oblique direction between the thickness direction of the display device and the plane direction. While the technique, described below, is applicable to either one of the vertical electric field mode and the horizontal electric field mode, the display device using the horizontal electric field mode will be described below as an example.

EMBODIMENT

Configuration of Display Device

Figure 2:
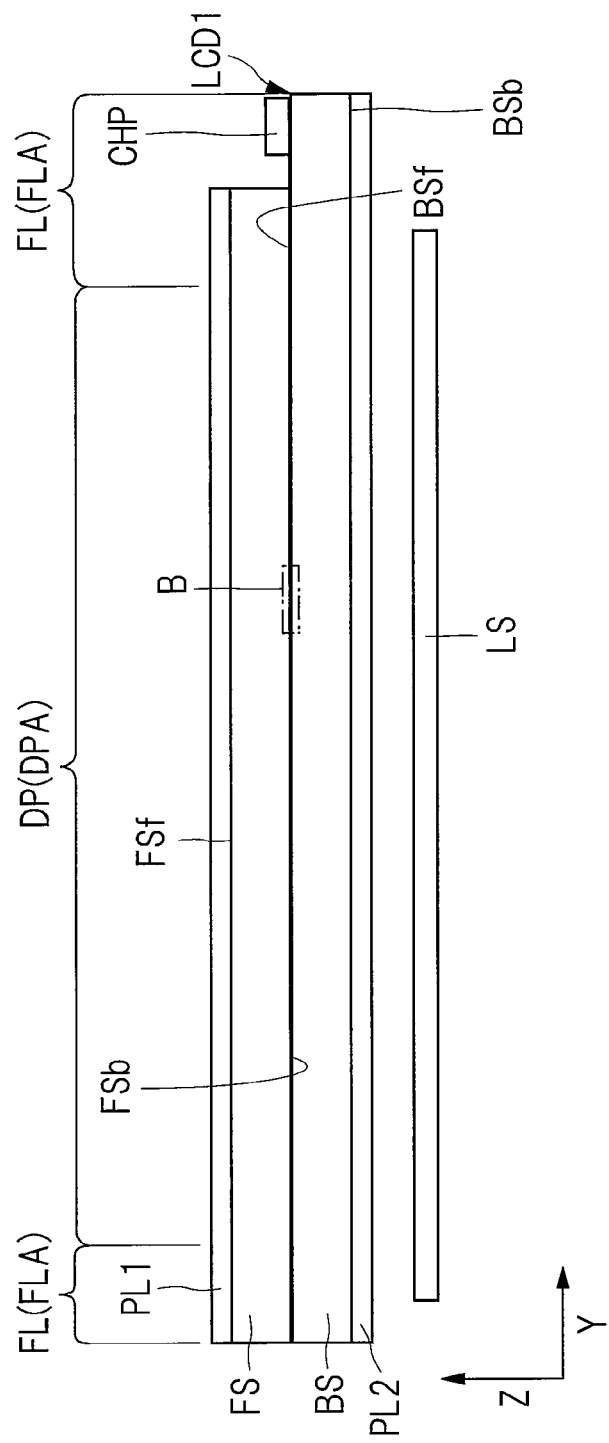
FIG. 2 is a cross-sectional view illustrating an example of a display device according to an embodiment.
Figure 3:
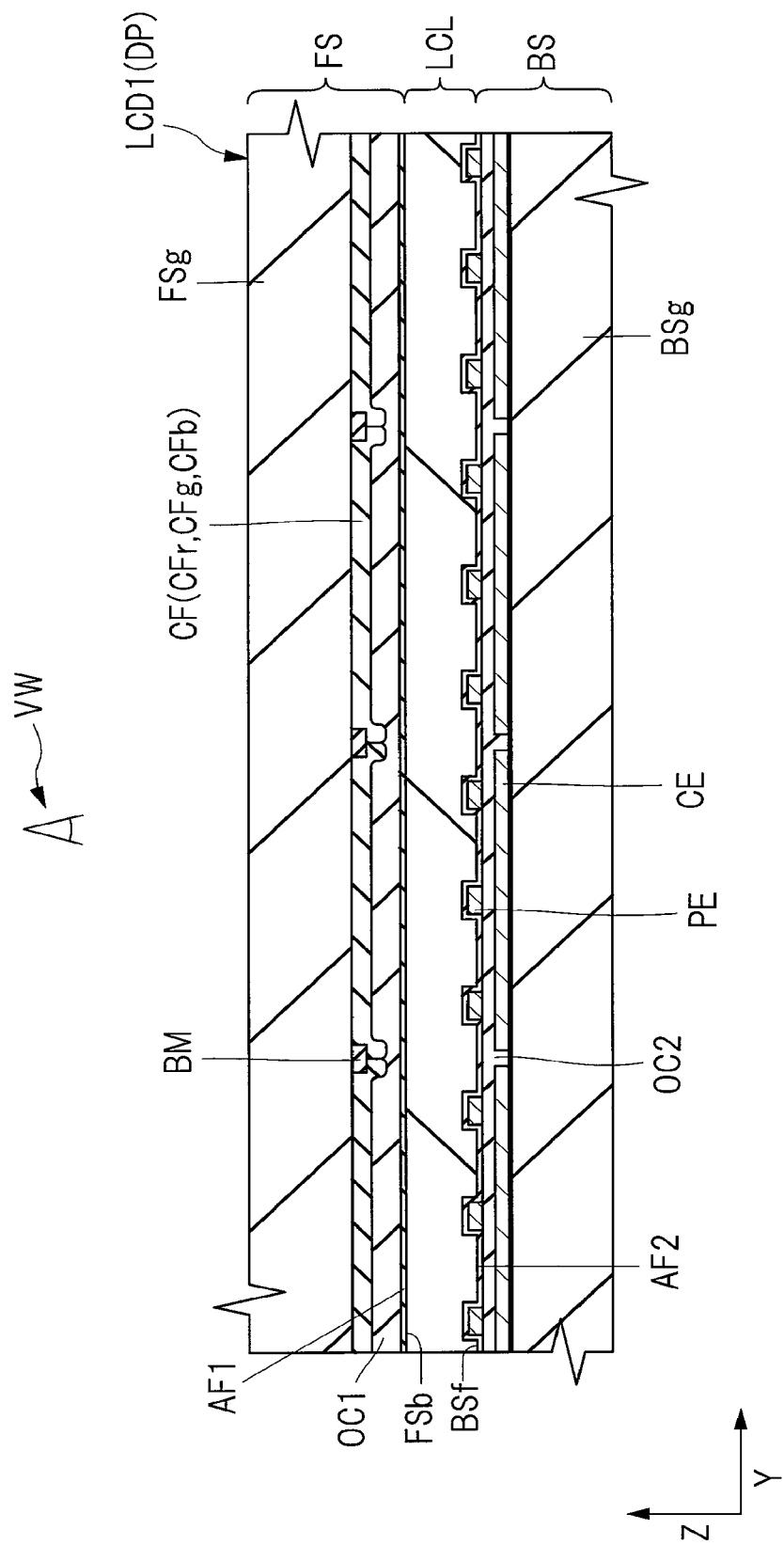
FIG. 3 is a cross-sectional view illustrating an example of a display device according to an embodiment.

A configuration of a display device will be first described. FIG. 1 is a plan view illustrating an example of a display device according to an embodiment. FIGS. 2 and 3 are cross-sectional views illustrating the example of the display device according to the embodiment. FIG. 2 is a cross-sectional view taken along a line A-A illustrated in FIG. 1. FIG. 3 is an enlarged sectional view of a portion B illustrated in FIG. 2.

In FIG. 1, the contour of a display region DPA is indicated by a two-dot and dash line to make a boundary between a display region DPA and a frame region (peripheral area) FLA easy to view in a plan view. A plurality of signal lines SL illustrated in FIG. 1 extend from the frame region FLA to the display region DPA. However, illustration of the signal lines SL is omitted in the display region DPA for ease of viewing in FIG. 1. FIG. 2 illustrates a cross section, where hatching is omitted for ease of viewing.

As illustrated in FIG. 1, a display device LCD1 according to the present embodiment includes a display section DP that displays an image. A region on the side of a front surface BSf (see FIG. 2) as the side of a display surface of the substrate BS and provided with the display section DP is a display region DPA. The display device LCD1 includes a frame section (peripheral section) FL, on which an image is not displayed, as a frame-shaped portion around the display section DP. A region where the frame section FL is provided is a frame region FLA. That is, the frame region FLA is a frame region around the display region DPA. However, the shape of the frame region FLA is not limited to a frame shape.

In the present specification, "in a plan view" means "as viewed from a direction perpendicular to a front surface BSf of the substrate BS".

The display device LCD1 has a structure in which a liquid crystal layer as a display functional layer is formed between a pair of substrates oppositely arranged. That is, the display device LCD1 includes a substrate FS on the side of a display surface, a substrate BS positioned on the opposite side to the substrate FS, and a liquid crystal layer LCL (see FIG. 3) arranged between the substrate FS and the substrate BS, as illustrated in FIG. 2.

Two directions intersecting each other and preferably perpendicular to each other in the front surface BSf of the substrate BS (see FIG. 2) include a Y-axis direction as a first direction and an X-axis direction as a second direction. At this time, the substrate BS illustrated in FIG. 1 has a side BSs1 extending in the X-axis direction, a side BSs2 extending parallel to the side BSs1 and in the X-axis direction, a side BSs3 extending in the Y-axis direction intersecting and preferably perpendicular to the X-axis direction, and a side BSs4 extending parallel to the side BSs3 and in the Y-axis direction. Respective distances from the sides BSs2, BSs3, and BSs4 of the substrate BS illustrated in FIG. 1 to the display section DP are substantially the same, and are smaller than a distance from the side BSs1 to the display section DP.

In the present specification, "a peripheral edge of the substrate BS" means any one of the side BSs1, the side BSs2, the side BSs3, and the side BSs4 constituting an outer edge of the substrate BS, and "a peripheral edge" means a peripheral edge of the substrate BS.

The display section DP includes pixels Px (see FIG. 4, described below) as a plurality of display elements. That is, the plurality of pixels Px are provided in the display region DPA. The plurality of pixels Px are arranged in a matrix form in the X-axis direction and the Y-axis direction. In the present embodiment, each of the plurality of pixels Px includes a thin-film transistor (TFT) formed in the display region DPA on the side of the front surface BSf of the substrate BS.

The display device LCD1 includes a plurality of scanning lines GL and a plurality of signal lines SL, as described below with reference to FIG. 4. Each of the plurality of scanning lines GL is electrically connected to the plurality of pixels Px arranged in the X-axis direction, and each of the plurality of signal lines SL is electrically connected to the plurality of pixels Px arranged in the Y-axis direction, as described below with reference to FIG. 4.

The display device LCD1 includes a circuit section CC. The circuit section CC includes a scanning line driving circuit CG and a signal line driving circuit CS. The scanning line driving circuit CG is electrically connected to the plurality of pixels Px, respectively, via the plurality of scanning lines GL, and the signal line driving circuit CS is electrically connected to the plurality of pixels Px via the plurality of signal lines SL.

In an example illustrated in FIG. 1, a semiconductor chip CHP is provided in a frame region FLAT as a portion between the side BSs1 of the substrate BS and the display section DP in the frame region FLA. The signal line driving circuit CS is provided in the semiconductor chip CHP. Therefore, the signal line driving circuit CS is provided in the frame region FLA1 as a region on the side of the front surface BSf of the substrate BS and arranged on the negative side in the Y-axis direction with respect to the display region DPA.

"The negative side in the Y-axis direction" in the present specification means the opposite side to the side on which an arrow indicating the Y-axis direction in the figure extends.

The semiconductor chip CHP may be provided in the frame region FLA1 using a so-called Chip On Glass (COG) technique. Alternatively, the semiconductor chip CHP may be provided outside the substrate BS, and may be connected to the display device LCD1 with Flexible Printed Circuits (FPC) interposed therebetween. Details of an arrangement of the signal lines SL will be described below with reference to FIG. 4.

The display device LCD1 includes a sealing section formed in the frame region FLA in a plan view. The sealing section is formed to continuously surround the display section DP. The substrate FS and the substrate BS illustrated in FIG. 2 are adhesively fixed to each other with a sealing material provided in the sealing section. When the sealing section is thus provided around the display section DP, the liquid crystal layer LCL (see FIG. 3) as the display functional layer can be sealed. The display functional layer is not limited to this. For example, the display functional layer may be one that controls a light transmission amount using a Micro Electro Mechanical System (MEMS) shutter.

As illustrated in FIG. 2, a polarizing plate PL2, which polarizes light emitted from a light source LS and directed toward a viewer VW (see FIG. 3), is provided on the side of a back surface BSb as the opposite side to the side of a display surface of the substrate BS in the display device LCD1. The polarizing plate PL2 is fixed to the substrate BS. On the other hand, a polarizing plate PL1 is provided on the side of a front surface FSf as the side of the display surface of the substrate FS. The polarizing plate PL1 is fixed to the substrate FS.

As illustrated in FIG. 3, the display device LCD1 includes a plurality of pixel electrodes PE arranged between the substrate FS and the substrate BS and a common electrode CE. The display device LCD1 in the present embodiment is a display device in a horizontal electric field mode, as described above. Therefore, each of the plurality of pixel electrodes PE and the common electrode CE are formed in the substrate BS.

The substrate BS illustrated in FIG. 3 includes a base material BSg composed of a glass substrate, and a circuit for image display is mainly formed on the base material BSg. The substrate BS has the front surface BSf positioned on the side of the substrate FS and the back surface BSb (see FIG. 2) positioned on the opposite side thereto. A display element such as a TFT and the plurality of pixel electrodes PE are formed in a matrix form on the side of the front surface BSf of the substrate BS.

In an example illustrated in FIG. 3, the display device LCD1 in the horizontal electric field mode (specifically, a Fringe Field Switching (FFS) mode) is illustrated. Therefore, the common electrode CE is formed on the side of a front surface of the base material BSg included in the substrate BS, and is covered with an insulating layer OC2. The plurality of pixel electrodes PE are formed in a portion, on the side of the substrate FS, of the insulating layer OC2 to oppose the common electrode CE with the insulating layer OC2 interposed therebetween.

The substrate FS illustrated in FIG. 3 is a substrate in which a color filter CF forming an image for color display is formed in a base material FSg composed of a glass substrate, and has the front surface FSf (see FIG. 2) on the side of the display surface and the back surface FSb positioned on the opposite side to the front surface FSf. The substrate having the color filter CF formed therein, like the substrate FS, is referred to as an opposite substrate because it opposes a color filter substrate or a TFT substrate with a liquid crystal layer interposed therebetween when distinguished from the substrate BS as a TFT substrate having the TFT formed therein. As a modification to FIG. 3, a configuration in which the color filter CF is provided in the substrate BS as a TFT substrate may be used.

In the substrate FS, the color filter CF configured by periodically arranging color filter pixels CFr, CFg, and CFb in three colors, i.e., red (R), green (G), and blue (B) is formed on one surface of the base material FSg composed of the glass substrate, for example. In a color display device, sub-pixels in three colors, R, G, and B are taken as one set, for example, to constitute one pixel. The plurality of color filter pixels CFr, CFg, and CFb in the substrate FS are arranged at positions opposing respective sub-pixels having the pixel electrodes PE formed in the substrate BS.

A light shielding film BM is formed at respective boundaries among the color filter pixels CFr, CFg, and CFb in the three colors. The light shielding film BM is composed of black resin or a metal having low reflectivity, for example. The light shielding film BM is formed in a lattice form in a plan view. In other words, the substrate FS includes the color filter pixels CFr, CFg, and CFb in the three colors respectively formed in opening portions in the light shielding film BM formed in a lattice form. The color constituting one pixel is not limited to the three colors R, G, and B, and may further include white (W) having a transparent filter. The color filter in white (W) need not be formed, or may be a white or transparent color filter. Alternatively, the shape of the light shielding film BM is not limited to the lattice form. For example, the light shielding film BM may be formed in a stripe form.

The frame region FLA is covered with the light shielding film BM. While the light shielding film BM is also formed in the display region DPA, the plurality of opening portions are formed in the light shielding film BM in the display region DPA. Generally, an end portion of the opening portion formed on the side of the peripheral edge among the opening portions, which are formed in the light shielding film BM and in which the color filter CF has been embedded, is defined as a boundary between the display region DPA and the frame region FLA. A dummy color filter may be provided on the side closer to the peripheral edge than the end portion of the opening portion. Alternatively, the substrate FS may have a resin layer OC1 covering the color filter CF and an oriented film AF1, and the substrate BS may have an oriented film AF2.

The liquid crystal layer LCL forming a display image by applying a display voltage between the pixel electrode PE and the common electrode CE is provided between the substrate FS and the substrate BS. The liquid crystal layer LCL modulates light that passes therethrough depending on a state of an electric field applied thereto.

The thickness of the liquid crystal layer LCL is significantly smaller than the respective thicknesses of the substrate FS and the substrate BS. For example, the thickness of the liquid crystal layer LCL is approximately 0.1% to 10% of the respective thicknesses of the substrate FS and the substrate BS.

<Equivalent Circuit of Display Device>

An equivalent circuit of a display device will be described below. FIG. 4 illustrates an equivalent circuit of the display device LCD1 according to the embodiment.

Figure 4:
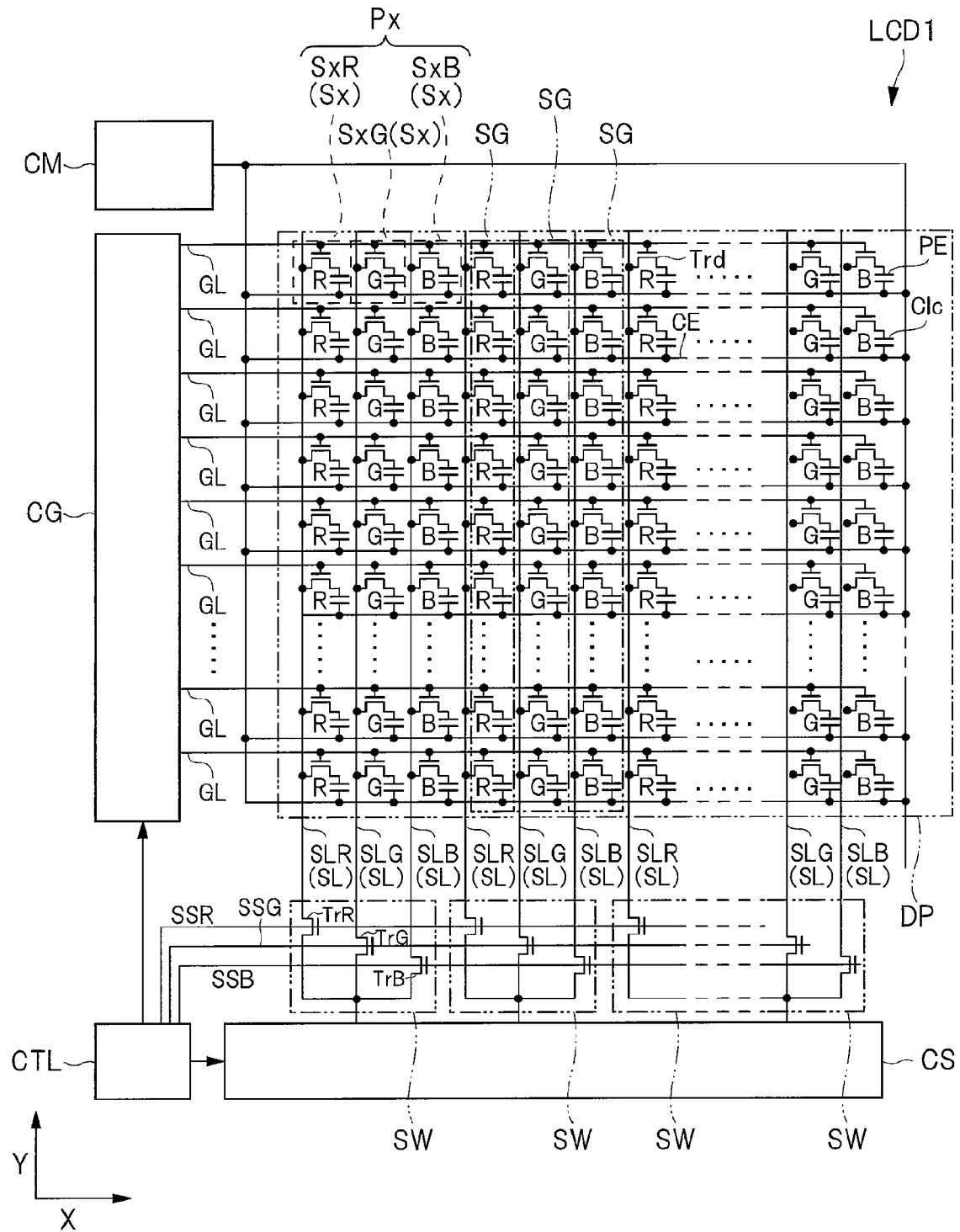
FIG. 4 is a diagram illustrating an equivalent circuit of the display device according to the embodiment.

As illustrated in FIG. 4, the display section DP in the display device LCD1 includes the plurality of pixels Px. The plurality of pixels Px are arranged in a matrix form in the X-axis direction and the Y-axis direction. That is, the display section DP is a pixel circuit having the pixels Px formed therein.

The display device LCD1 includes the plurality of scanning lines GL and the plurality of signal lines SL. The plurality of scanning lines GL respectively extend in the X-axis direction, and are arranged in the Y-axis direction.

The plurality of scanning lines SL respectively extend in the Y-axis direction, and are arranged in the X-axis direction. The plurality of signal lines SL and the plurality of scanning lines GL intersect each other.

Each of the plurality of pixels Px includes sub-pixels Sx respectively representing the colors R, G, and B. While each of the sub-pixels Sx is provided in a region surrounded by the two scanning lines GL adjacent to each other and the two signal lines SL adjacent to each other, the two sub-pixels may be provided in a region surrounded by the two scanning lines GL adjacent to each other and the two signal lines SL adjacent to each other.

Each of the sub-pixels Sx includes a transistor Trd of a thin film transistor, the pixel electrode PE connected to a drain electrode in the transistor Trd, and the common electrode CE opposing the pixel electrode PE with a liquid crystal layer sandwiched therebetween. A liquid crystal capacitance Clc equivalently represents a liquid crystal layer. Further, illustration of a storage capacitance formed between the common electrode CE and the pixel electrode PE is omitted in FIG. 4. Respective potentials having different polarities are fed to the liquid crystal layer. Thus, the drain electrode and a source electrode in the transistor Trd may be replaced with each other, as needed, depending on the polarity of the potential.

The display device LCD1 includes a signal line driving circuit CS, a scanning line driving circuit CG, a display control circuit CTL, and a common electrode driving circuit CM.

The source electrode in each of the transistors Trd in the plurality of sub-pixels Sx arranged in the Y-axis direction is connected to the signal line SL. Each of the plurality of signal lines SL corresponds to display data, and is connected to the signal line driving circuit CS to which a video signal fed to each of the sub-pixels Sx is input. That is, the plurality of signal lines SL connect the plurality of sub-pixels Sx and the signal line driving circuit CS.

A gate electrode in each of the transistors Trd in the plurality of sub-pixels Sx arranged in the X-axis direction is connected to the scanning line GL. Each of the scanning lines GL is connected to the scanning line driving circuit CG that feeds a scanning signal to be fed to the sub-pixels Sx during one horizontal scanning period of time.

The display control circuit CTL controls the signal line driving circuit CS, the scanning line driving circuit CG, and the common electrode driving circuit CM based on display data, a clock signal, and a display control signal such as a display timing signal that are transmitted from outside the display device LCD1.

The display control circuit CTL converts the display data and the display control signal fed from outside, as needed, and outputs the display data and the display control signal to the signal line driving circuit CS, the scanning line driving circuit CG, and the common electrode driving circuit CM depending on the arrangement of the sub-pixels in the display device LCD1, a display method, or the presence or absence of a touch panel.

In an example illustrated in FIG. 4, signal lines SLR, SLG, and SLB are provided as the signal line SL connected to each of the sub-pixels Sx. The signal lines SLR, SLG, and SLB are connected to a signal line switch circuit SW. The signal line SLR is a red signal line connected to sub-pixels SxR as the sub-pixel Sx for displaying the red color different from both the blue and green colors. The signal line SLG is a green signal line connected to sub-pixels SxG as the sub-pixel Sx for displaying the green color different from both the blue and red colors. The signal line SLB is a blue signal line connected to the sub-pixels SxB as the sub-pixel Sx for displaying the blue color different from both the red and green colors.

Specifically, each of the signal lines SLR displays the red color, and is connected to a sub-pixel group SG including the plurality of sub-pixels SxR arranged in the Y-axis direction. Each of the signal line SLG displays the green color, and is connected to a sub-pixel group SG including the plurality of sub-pixels SxG arranged in the Y-axis direction. Each of the signal line SLB displays the blue color, and is connected to a sub-pixel group SG including the plurality of sub-pixels SxB arranged in the Y-axis direction.

As described above, the plurality of signal lines SL respectively extend in the Y-axis direction, and are arranged in the X-axis direction. Therefore, each of the signal lines SLR, SLG, and SLB extends in the Y-axis direction.

The signal line switch circuit SW is a control circuit that feeds a signal relating to an image to the display section DP as the pixel circuit. The signal line switch circuit SW includes transistors TrR, TrG, and TrB each as a switching element. That is, the transistors TrR, TrG, and TrB are provided in the signal line switch circuit SW as the control circuit. Each of the transistors TrR, TrG, and TrB is a thin film transistor, for example.

The transistor TrR connects the red signal line SLR and the signal line driving circuit CS. The transistor TrG connects the green signal line SLG and the signal line driving circuit CS. The transistor TrB connects the blue signal line SLB and the signal line driving circuit CS.

The transistors TrR, TrG, and TrB are controlled to be respectively turned on and off in response to switch changeover signals SSR, SSG, and SSB output from the display control circuit CTL. The transistor TrR is controlled to be turned on and off in response to the switch changeover signal SSR, the transistor TrG is controlled to be turned on and off in response to the switch changeover signal SSG, and the transistor TrB is controlled to be turned on and off in response to the switch changeover signal SSB.

Specifically, during a first period of one horizontal scanning period, the transistor TrR is turned on, the transistors TrG and TrB are turned off, and a red video signal output from the signal line driving circuit CS is output to the red signal line SLR. Then, during a second period of the one horizontal scanning period, the transistor TrG is turned on, the transistors TrB and TrR are turned off, and a green video signal output from the signal line driving circuit CS is output to the green signal line SLG. During a third period of one horizontal scanning period, the transistor TrB is turned on, the transistors TrR and TrG are turned off, and a blue video signal output from the signal line driving circuit CS is output to the blue signal line SLB.

Thus, the signal line driving circuit CS feeds a video signal corresponding to the display data to the signal line SL for each horizontal scanning period.

The display control circuit CTL controls the transistor TrR, the transistor TrG, and the transistor TrB in the signal line switch circuit SW to be turned on and off as the signal line driving circuit CS controls the red video signal, the green video signal, and the blue video signal to be output in a time-divisional manner within one horizontal period. That is, the transistors Tr included in the signal line switch circuit SW have a relationship in which they are driven in a time-divisional manner. The display control circuit CTL controls, in a period during which the video signal in each of the colors is output, the scanning line driving circuit CG to maintain an on-state of the transistor Trd in the sub-pixels Sx into which the video signal is written.

The signal line switch circuit SW may be merely referred to as RGB switches or time-division switches. In the present specification, while one signal line switch circuit is provided in three signal lines respectively connected to red, green, and blue sub-pixels, one signal line switch circuit may be provided in two signal lines respectively connected to two sub-pixels. Alternatively, one signal line switch circuit may be provided in six signal lines connected to two pixels, i.e., six sub-pixels. In this case, the signal line driving circuit outputs a video signal six times during one horizontal period. The number of time divisions can be optionally set depending on a situation where the video signal is written into each of the sub-pixels and the processing capability of the signal line driving circuit.

The scanning line driving circuit CG sequentially selects the scanning lines GL downward from the top or upward from the bottom, outputs the scanning signal to be fed to the selected scanning line GL for each horizontal scanning period. The transistors Trd in the plurality of sub-pixels Sx connected to the selected scanning line GL are rendered conductive during the one horizontal scanning period. The video signal fed to the signal line SLR, SLG, or SLB is output to the pixel electrode PE via the transistor Trd that is in a conductive state during the one horizontal scanning period, and a storage capacitance (not illustrated) and the liquid crystal capacitance Clc are finally changed, to control orientation of liquid crystal molecules. Thus, an image is displayed in the display section DP.

<Arrangement of Transistors in Signal Line Switch Circuit>

Figure 5:
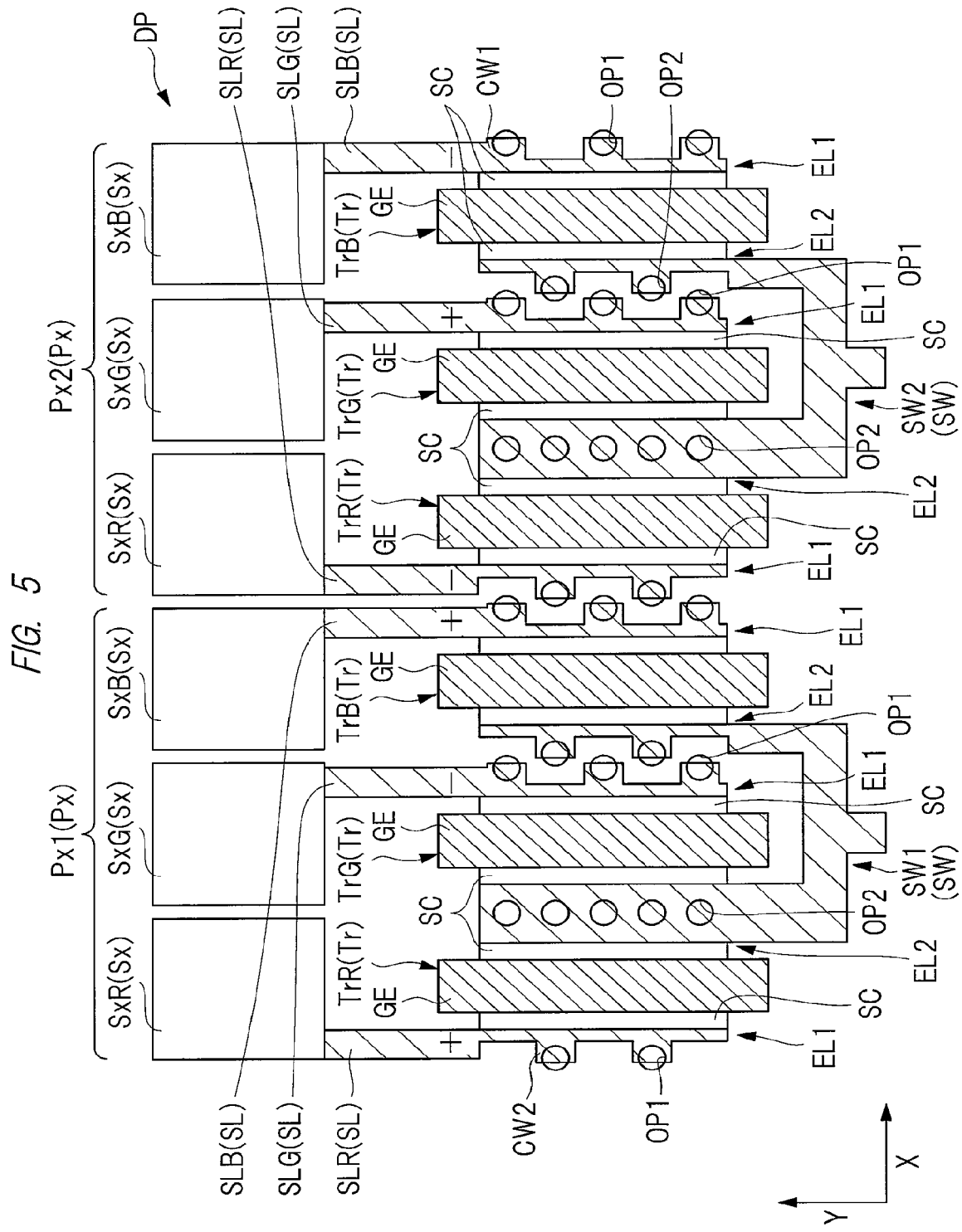
FIG. 5 is a plan view of transistors in a signal line switch circuit in the display device according to the embodiment.
Figure 6:
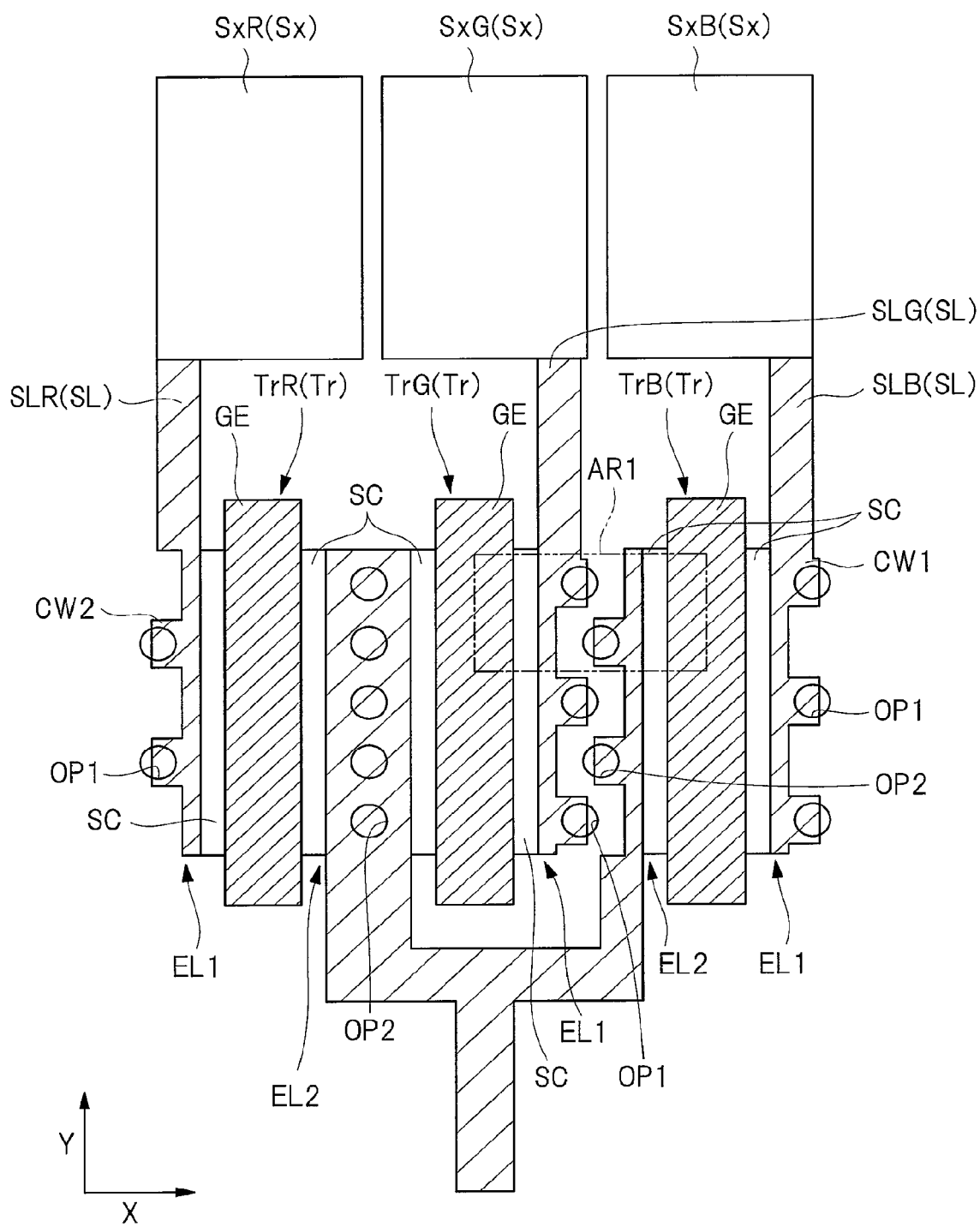
FIG. 6 is a plan view of transistors in a signal line switch circuit in the display device according to the embodiment.
Figure 7:
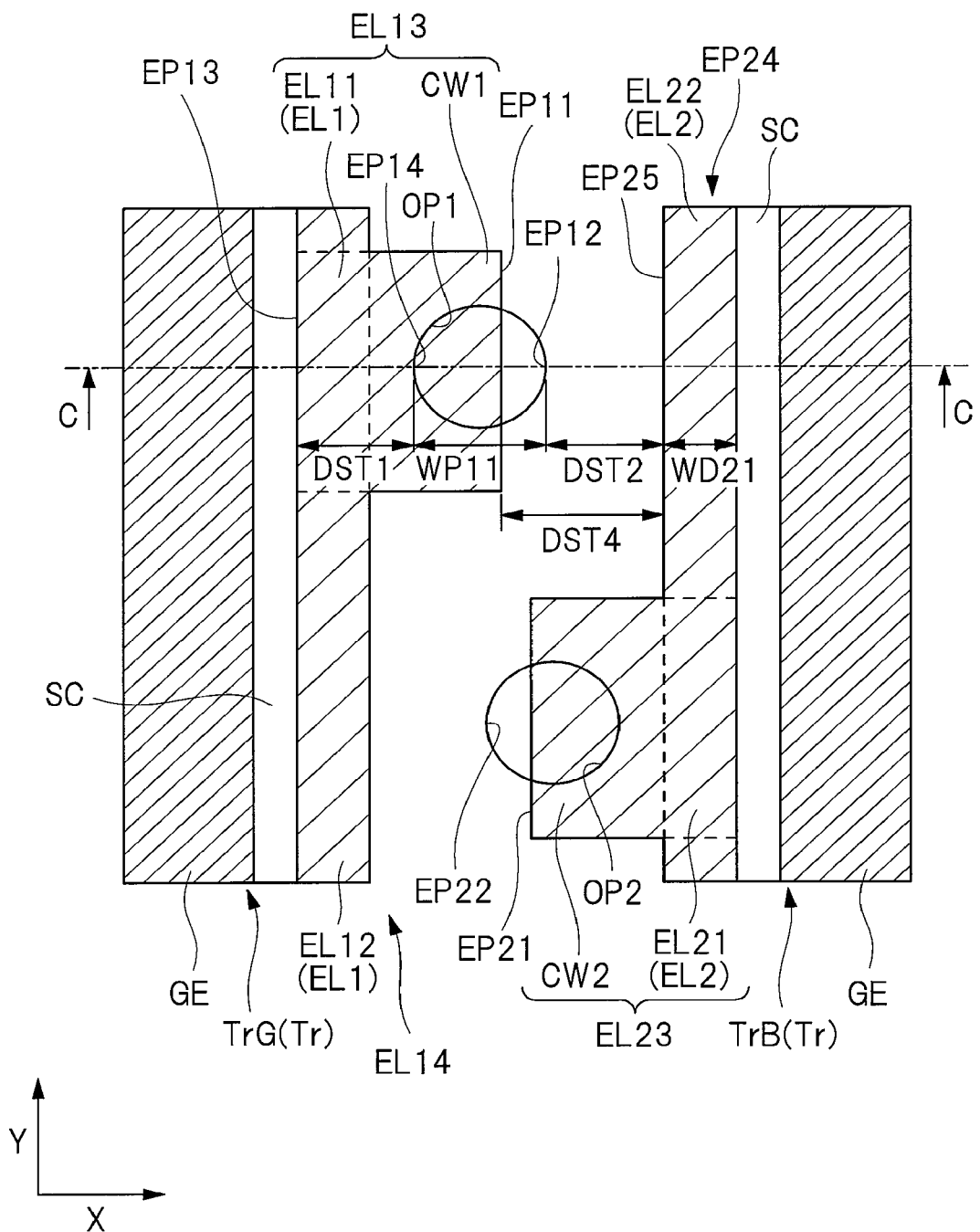
FIG. 7 is a plan view of transistors in a signal line switch circuit in the display device according to the embodiment.
Figure 10:
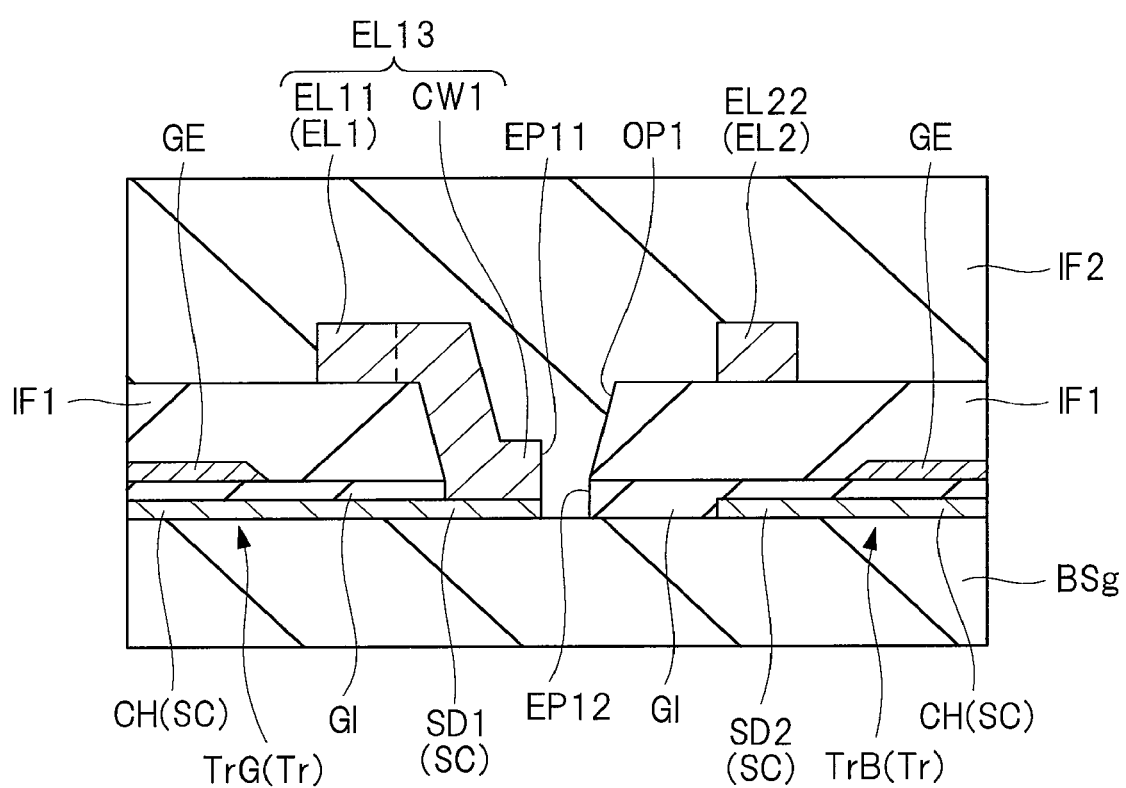
FIG. 10 is a cross-sectional view of transistors in a signal line switch circuit in the display device according to the embodiment.
Figure 11:
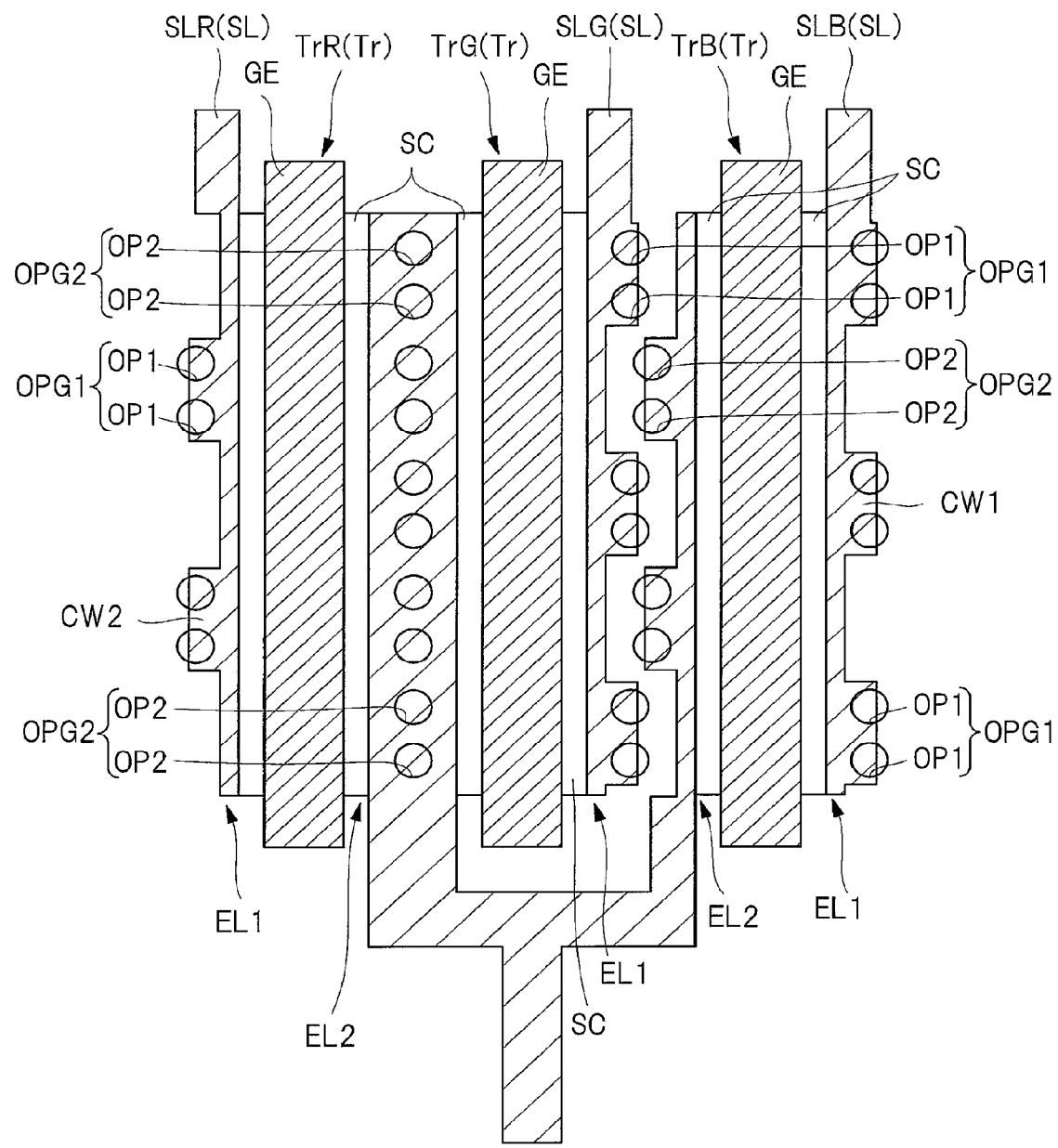
FIG. 11 is a plan view of transistors in a signal line switch circuit in the display device according to the embodiment.
Figure 12:
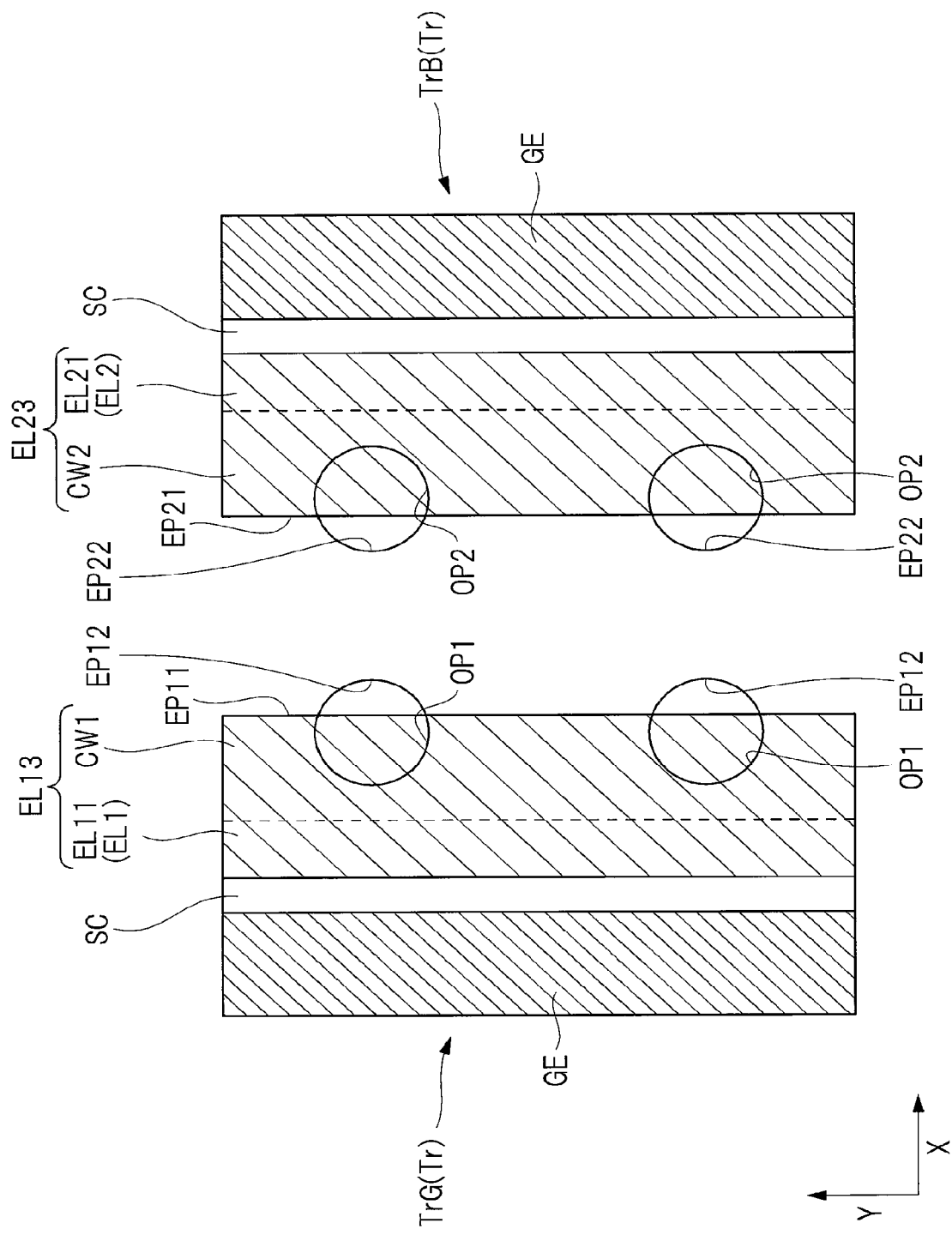
FIG. 12 is a plan view of transistors in a signal line switch circuit in the display device according to the embodiment.

An arrangement of transistors in a signal line switch circuit will be described below. FIGS. 5 to 7 are plan views of transistors in the signal line switch circuit SW in the display device LCD1 according to the embodiment. FIGS. 8 to 10 are cross-sectional views of the transistors in the signal line switch circuit SW in the display device LCD1 according to the embodiment. FIGS. 11 and 12 are plan views of the transistors in the signal line switch circuit SW in the display device LCD1 according to the embodiment.

FIG. 5 illustrates six signal lines SL and six transistors Tr (the number of signal line switch circuits SW is two). FIG. 6 illustrates the three signal lines SL and the three transistors Tr among the six signal lines SL and the six transistors Tr illustrated in FIG. 5 in an enlarged manner. FIG. 7 illustrates a region AR surrounded by a two-dot and dash line illustrated in FIG. 6 in an enlarged manner. FIGS. 8 to 10 are cross-sectional views taken along a line C-C line illustrated in FIG. 7. In FIGS. 8 to 10, illustration of a portion above an insulating film IF2 is omitted.

A case where each of pixels Px includes sub-pixels Sx in three colors, e.g., red, green, and blue, for example, will be described below as an example. However, each of the pixels Px may include four sub-pixels Sx in red, green, blue, and white, as described with reference to FIG. 4.

In the present embodiment, between the sub-pixel SW included in the given pixel Px and the sub-pixel SW included in the other pixel Px, signal line switch circuits respectively including transistors connected to the sub-pixels are not replaced with each other. However, the order in arrangement of the sub-pixels in the X-axis direction and the order in arrangement in the X-axis direction of the transistors included in the signal line switch circuit do not correspond to each other, and may be replaced with each other, as described below in a modification to the embodiment, for example.

In an example illustrated in FIG. 5, the display section DP includes a pixel Px1 as a first pixel and a pixel Px2 as a second pixel. Each of the pixel Px1 as the first pixel and the pixel Px2 as the second pixel includes a red sub-pixel SxR (a third sub-pixel), a green sub-pixel SxG (a first sub-pixel), and a blue sub-pixel SxB (a second sub-pixel) as the sub-pixels Sx respectively having different colors. The sub-pixels SxR, SxG, and SxB are arranged in the X-axis direction.

In the example illustrated in FIG. 5, the signal line switch circuit SW includes a transistor (third transistor) TrR as a red transistor Tr, a transistor (first transistor) Tr as a green transistor Tr, and a transistor (second transistor) TrB as a blue transistor Tr.

As illustrated in FIGS. 5 to 8, the transistor Tr is a thin film transistor, and includes a gate electrode GE, a gate insulating film GI, a semiconductor film SC, an insulating film IF1, source-drain electrodes EL1 and EL2 as a source electrode and a drain electrode, and connection wirings CW1 and CW2 each as a conductive wiring. The plurality of transistors Tr are arranged in the X-axis direction as a gate length direction. That is, the green transistor TrG and the blue transistor TrB are adjacent to each other in the gate length direction, and the red transistor TrR and the green transistor TrG are adjacent to each other in the gate length direction. The gate electrode GE is also referred to as a gate line.

In an example illustrated in FIG. 8, the transistor Tr is a thin film transistor of a bottom gate type. Therefore, the gate electrode GE is provided on the base material BSg included in the substrate BS (see FIG. 2), as illustrated in FIG. 8.

The gate insulating film GI is provided to cover the gate electrode GE on the base material BSg. The gate insulating film GI is a transparent insulating film composed of silicon nitride (SiN) or silicon oxide ($SiO_2$).

The semiconductor film SC is provided on the gate insulating film GI in a portion overlapping the gate electrode GE in a plan view and on the gate insulating film GI in portions on both sides with the gate electrode GE sandwiched therebetween. The semiconductor film SC is composed of amorphous silicon or polycrystalline silicon (polysilicon), for example. A transparent oxide semiconductor represented by zinc-based oxides such as IZO (Indium Zinc Oxide) and IGZO (Indium Gallium Zinc Oxide) may be used.

FIGS. 7 and 8 illustrate a region from the gate electrode GE in the transistor TrG to the gate electrode GE in the transistor TrB.

A portion overlapping the gate electrode GE in a plan view in the semiconductor film SC is a channel region CH. A portion, arranged on the side connected to the signal line SL with respect to the gate electrode GE, of the semiconductor film SC is a source-drain region SD1 as one of a source region and a drain area. A portion, arranged on the opposite side to the side connected to the signal line SL with respect to the gate electrode GE, of the semiconductor film SC, i.e., on the side connected to the signal line driving circuit CS (see FIG. 4) is a source-drain region SD2 as the other of the source region and the drain region.

The gate electrode GE and the channel region CH extend in the Y-axis direction, for example. At this time, the length of the channel region CH in the X-axis direction is a channel length, i.e., a gate length, and the width of the channel region CH in the Y-axis direction is a channel width, i.e., a gate width. The gate width is larger than the gate length.

As described above with reference to FIG. 4, the signal line SL is connected to the sub-pixel group SG including the plurality of sub-pixels Sx arranged in the Y-axis direction. Therefore, a relatively large current flows in the signal line SL and the transistor Tr. Therefore, in the transistor Tr, the channel width of the channel region CH is significantly larger than the channel length of the channel region CH. That is, the gate width is larger than the gate length. To efficiently arrange the plurality of transistors Tr the gate width of which is larger than the gate length thereof, the plurality of transistors Tr are arranged in the gate length direction, as described above.

The insulating film IF1 is provided to cover respective exposed portions of the channel region CH, the source-drain regions SD1 and SD2, and the gate insulating film GI. The insulating film IF1 is a transparent insulating film composed of silicon nitride (SiN) or silicon oxide ($SiO_2$), for example.

The insulating film IF1 in a portion positioned above the source-drain region SD1 is provided with an opening portion (contact hole) OP1 that reaches the source-drain region SD1 by penetrating the insulating film IF1. An upper surface of the source-drain region SD1 is exposed to a bottom surface of the opening portion OP1.

The insulating film IF1 in a portion positioned above the source-drain region SD2 is provided with an opening portion (contact hole) OP2 that reaches the source-drain region SD2 by penetrating the insulating film IF1. An upper surface of the source-drain region SD2 is exposed to a bottom surface of the opening portion OP2.

In the examples illustrated in FIGS. 5 to 7, each of the opening portions OP1 and OP2 has a circular shape in a plan view. However, a planar shape of each of the opening portions OP1 and OP2 is not limited to a circular shape. Therefore, each of the opening portions OP1 and OP2 may have a rectangular shape such as a square shape in a plan view.

The source-drain region EL1 as one of the source electrode and the drain electrode is formed on the insulating film IF1 in a portion positioned on the source-drain region SD1. The source-drain electrode EL2 as the other of the source electrode and the drain electrode is formed on the insulating film IF1 in a portion positioned above the source-drain region SD2. Therefore, the source-drain electrodes EL1 and EL2 are arranged in the X-axis direction different from the Y-axis direction as a direction in which the gate electrode GE extends. The source-drain electrode EL1 is electrically connected to the signal line SL, and the source-drain electrode EL2 is electrically connected to the signal line driving circuit CS (see FIG. 4).

Within the opening portion OP1 and on the insulating film IF1 in a portion adjacent to the opening portion OP1 in a plan view, the connection wiring CW1 as the conductive wiring is formed. The connection wiring CW1 is electrically connected to the source-drain region SD1 exposed to the bottom surface of the opening portion OP1. The connection wiring CW1 is electrically connected to the source-drain electrode EL1. Therefore, the connection wiring CW1 electrically connects the semiconductor film SC, i.e., the source-drain region SD1 and the source-drain electrode EL1 to each other via the opening portion OP1. As illustrated in FIGS. 5 to 8, the connection wiring CW1 is formed integrally with the source-drain electrode EL1.

Within the opening portion OP2 and on the insulating film IF1 in a portion adjacent to the opening portion OP2 in a plan view, the connection wiring CW2 as the conductive wiring is formed. The connection wiring CW2 is electrically connected to the source-drain region SD2 exposed to the bottom surface of the opening portion OP2. The connection wiring CW2 is electrically connected to the source-drain electrode EL2. Therefore, the connection wiring CW2 electrically connects the semiconductor film SC, i.e., the source-drain region SD2 and the source-drain electrode EL2 to each other via the opening portion OP2. As illustrated in FIGS. 5 to 8, the connection wiring CW2 is formed integrally with the source-drain electrode EL2.

The source-drain electrodes EL1 and EL2 and the connection wirings CW1 and CW2 are composed of an opaque metal stacked film obtained by stacking titanium (Ti), aluminum (Al), and titanium (Ti) in this order toward an upper surface from a lower surface, for example.

An end portion EP11, on the side of the blue transistor TrB, of the connection wiring CW1 is formed inside the opening portion OP1. There is a clearance between the end portion EP11, on the side of the blue transistor TrB, of the connection wiring CW1 and an end portion EP12, on the side of the blue transistor TrB, of the opening portion OP1 in a plan view. That is, the end portion EP11 of the connection wiring CW1 is arranged on the opposite side to the side of the blue transistor TrB with respect to the end portion EP12 of the opening portion OP1.

Accordingly, a distance between the green transistor TrG and the blue transistor TrB in the X-axis direction can be reduced. Thus, an average value of distances among the respective centers of the transistors Tr, which are included in the signal line switch circuit SW and are arranged in the X-axis direction, can be reduced. Therefore, the area of the frame region FLA1 (see FIG. 1) can be reduced.

A positional relationship between an end portion EP21, on the side of the green transistor TrG, of the connection wiring CW2 in the blue transistor TrB and an end portion EP22, on the side of the green transistor TrG, of the opening portion OP2 in the blue transistor TrB is also similar to a positional relationship between the end portion EP11 and the end portion EP12.

That is, there is a clearance between the end portion EP21 of the connection wiring CW2 and the end portion EP22 of the opening portion OP2 in a plan view. That is, the end portion EP21 of the connection wiring CW2 is formed inside the opening portion OP2. In other words, the end portion EP21 of the connection wiring CW2 is arranged on the opposite side to the side of the green transistor TrG with respect to the end portion EP22 of the opening portion OP2.

In the present specification, the end portion EP12, on the side of the blue transistor TrB, of the opening portion OP1 in the green transistor TrG means an end portion on not an upper surface but a bottom surface of the opening portion OP1, and the end portion EP22, on the side of the green transistor TrG, of the opening portion OP2 in the blue transistor TrB means an end portion on not an upper surface but a bottom surface of the opening portion OP2.

The insulating film IF2 is formed to cover the source-drain electrode EL1 within the opening portion OP1 in the green transistor TrG and on the insulating film IF1. The insulating film IF2 is a transparent insulating film composed of an organic film, for example.

Preferably, the opening portion OP1 and the source-drain electrode EL2 in the blue transistor TrB are spaced apart from each other in a plan view. When the end portion EP11 of the connection wiring CW1 is removed using a method such as etching, a part of the connection wiring CW1 may remain as a residue within the opening portion OP1. If the opening portion OP1 and the source-drain electrode EL2 are spaced apart from each other, however, the connection wiring CW1 and the source-drain electrode EL2 can be prevented from being short-circuited.

In a modification to FIG. 8, illustrated in FIG. 9, a connection wiring CW1 formed within an opening portion OP1 is electrically connected to a source-drain region SD1 exposed to the bottom on a side surface of the opening portion OP1. An end portion EP11 of the connection wiring CW1 is formed inside an end portion EP12 of the opening portion OP1. Therefore, a gate insulating film GI is not covered with the connection wiring CW1 in a portion, on the side of a blue transistor TrB, of a bottom surface of the opening portion OP1.

Alternatively, a transistor Tr may be a thin film transistor of a top gate type, as illustrated in FIG. 10. In an example illustrated in FIG. 10, a semiconductor film SC is formed on a base material BSg, a gate electrode GE is formed on a semiconductor film SC with the gate insulating film GI interposed therebetween, and an insulating film IF1 is formed to cover the gate electrode GE on the gate insulating film GI. The opening portion OP1 reaches the semiconductor film SC after penetrating the insulating film IF1 and the gate insulating film GI.

That is, whether the transistor Tr is composed of a thin film transistor of a bottom gate type or a thin film transistor of a top gate type, the semiconductor film SC is overlapped with the source-drain electrodes EL1 and EL2 and the gate electrode GE with one or both of the insulating film IF1 and the gate insulating film GI as an insulating film interposed therebetween.

Preferably, a green transistor TrG has a plurality of opening portions OP1 arranged on the side of a blue transistor TrB with respect to the gate electrode GE in the green transistor TrG. The blue transistor TrB has a plurality of opening portions OP2 arranged on the side of the green transistor TrG with respect to the gate electrode GE in the blue transistor TrB.

At this time, the plurality of opening portions OP1 are arranged in the Y-axis direction in the green transistor TrG, and the plurality of opening portions OP2 are arranged in the Y-axis direction in the blue transistor TrB. The opening portions OP1 and the opening portions OP2 are alternately arranged in the Y-axis direction.

Thus, a distance between the green transistor TrG and the blue transistor TrB in the X-axis direction can be further reduced.

As illustrated in FIG. 7, the source-drain electrode EL1 may include an electrode section EL11 and an electrode section EL12 alternately arranged in the Y-axis direction. An electrode section EL11 is a portion, connected to the connection wiring CW1, of the source-drain electrode EL1, and the electrode section EL12 is a portion, not connected to the connection wiring CW1, of the source-drain electrode EL1. When a portion formed by the electrode section EL11 and the connection wiring CW1 is an electrode section EL13, the electrode section EL12 has a width smaller than the width in the X-axis direction of the electrode section EL13.

The source-drain electrode EL1 and the plurality of connection wirings CW1 connected to the source-drain electrode EL1 form an electrode section EL14. At this time, the electrode section EL14 has an irregular shape in a plan view. The opening portion OP1 overlaps the connection wiring CW1 in the electrode section EL13 having a projection in the irregular shape in a plan view.

The source-drain electrode EL2 may include an electrode section E21 and an electrode section EL22 alternately arranged in the Y-axis direction. An electrode section EL21 is a portion, connected to the connection wiring CW2, of the source-drain electrode EL2, and the electrode section EL22 is a portion, not connected to the connection wiring CW2, of the source-drain electrode EL2. When a portion formed by the electrode section EL21 and the connection wiring CW2 is an electrode section EL23, the electrode section EL22 has a width smaller than the width in the X-axis direction of the electrode section EL23.

The source-drain electrode EL2 and the plurality of connection wirings CW2 connected to the source-drain electrode EL2 form an electrode section EL24. At this time, the electrode section EL24 has an irregular shape in a plan view. The opening portion OP2 overlaps the connection wiring CW2 in the electrode section EL23 having a projection in the irregular shape in a plan view.

The connection wirings CW1 and the connection wirings CW2 may be alternately arranged in the Y-axis direction, and the opening portions OP1 and the opening portions OP2 may be alternately arranged in the Y-axis direction. That is, the electrode sections EL13 and the electrode sections EL23 may be alternately arranged in the Y-axis direction.

At this time, the opening portion OP1 and the opening portion OP2 preferably overlap each other in the Y-axis direction. That is, the opening portion OP1 and the opening portion OP2 overlap each other when viewed in the Y-axis direction. Thus, a distance between the green transistor TrG and the blue transistor TrB in the X-axis direction can be further reduced.

Alternatively, as illustrated in FIG. 11, a green transistor TrG may include an opening portion group OPG1 of a plurality of the opening portions OP1 arranged on the side of a blue transistor TrB with respect to a gate electrode GE in the green transistor TrG, and the blue transistor TrB may include an opening portion group OPG2 of a plurality of the opening portions OP2 arranged on the side of the green transistor TrG with respect to a gate electrode GE in the blue transistor TrB.

At this time, the opening portion groups OPG1 may be arranged in the Y-axis direction in the green transistor TrG, and the opening portion groups OPG2 may be arranged in the Y-axis direction in the blue transistor TrB. In such a form, the opening portions OP1 and the opening portions OP2 may be alternately arranged in the Y-axis direction.

In such a case, a distance between the green transistor TrG and the blue transistor TrB in the X-axis direction can be further reduced.

At this time, the opening portion groups OPG1 and the opening portion groups OPG2 may overlap each other in the Y-axis direction. That is, the opening portion groups OPG1 and the opening portion groups OPG2 may overlap each other when viewed in the Y-axis direction. In such a case, a distance between the green transistor TrG and the blue transistor TrB in the X-axis direction can also be further reduced.

As illustrated in FIG. 6, the source-drain electrode EL1 in the green transistor TrG and the source-drain electrode EL2 in the blue transistor TrB are adjacent to each other in the X-axis direction, and do not overlap each other in the Y-axis direction.

Alternatively, the connection wiring CW1 in the green transistor TrG and the connection wiring CW2 in the blue transistor TrB do not overlap each other in the Y-axis direction. In such a case, a distance between the green transistor TrG and the blue transistor TrB in the X-axis direction can also be further reduced.

A red transistor TrR is arranged on the opposite side to the blue transistor TrB with the green transistor TrG sandwiched therebetween. At this time, the source-drain electrode EL2 in the red transistor TrR may be shared with the source-drain electrode EL2 in the green transistor TrG.

The green transistor TrG and the red transistor TrR may have a plurality of common opening portions OP2 arranged between the gate electrode GE in the green transistor TrG and the gate electrode GE in the red transistor TrR in a plan view. At this time, the plurality of common opening portions OP2 may be arranged in the Y-axis direction.

Such an arrangement enables a distance between the green transistor TrG and the red transistor TrR in the X-axis direction to be reduced. Thus, an average value of respective distances among the centers of the transistors Tr included in the signal line switch circuit SW and arranged in the X-axis direction can be reduced. Therefore, the area of the frame region FLA can be reduced.

Alternatively, the green transistor TrG and the red transistor TrR may have opening portion groups OPG2 of the plurality of common opening portions OP2 arranged between the gate electrode GE in the green transistor TrG and the gate electrode GE in the red transistor TrR in a plan view, as illustrated in FIG. 11. At this time, the opening portion groups OP2 may be arranged in the Y-axis direction. In such a case, a distance between the green transistor TrG and the red transistor TrR in the X-axis direction can also be reduced.

As illustrated in FIG. 12, a connection wiring CW1 may be integrally formed along a source-drain electrode EL1, and a connection wiring CW2 may be integrally formed along a source-drain electrode EL2. At this time, opening portions OP1 and opening portions OP2 need not be alternately arranged in the Y-axis direction, or may be arranged at the same position in the Y-axis direction.

<Distance Between Centers of Transistors>

Figure 13:
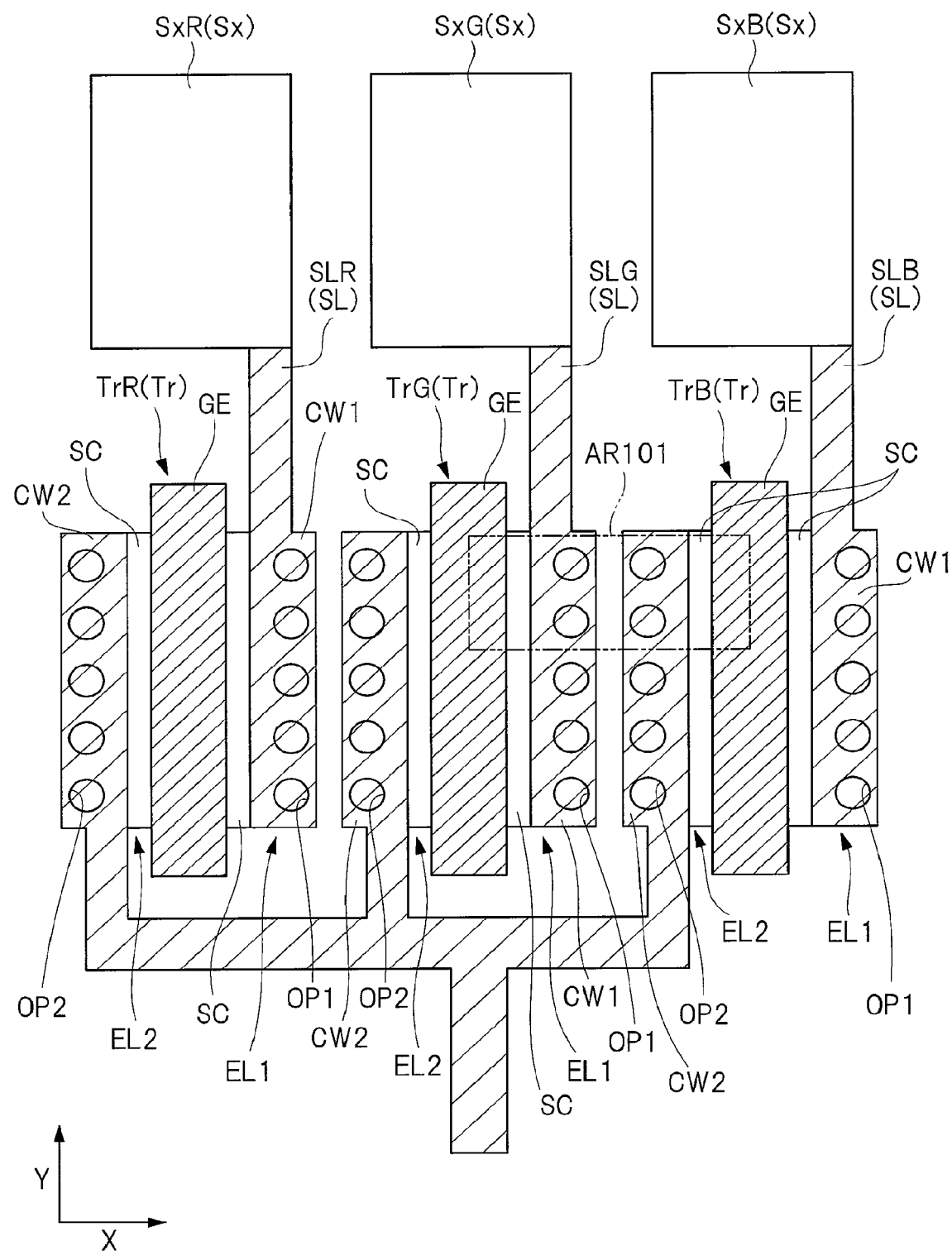
FIG. 13 is a plan view of transistors in a signal line switch circuit in the display device according to a first comparison example.
Figure 14:
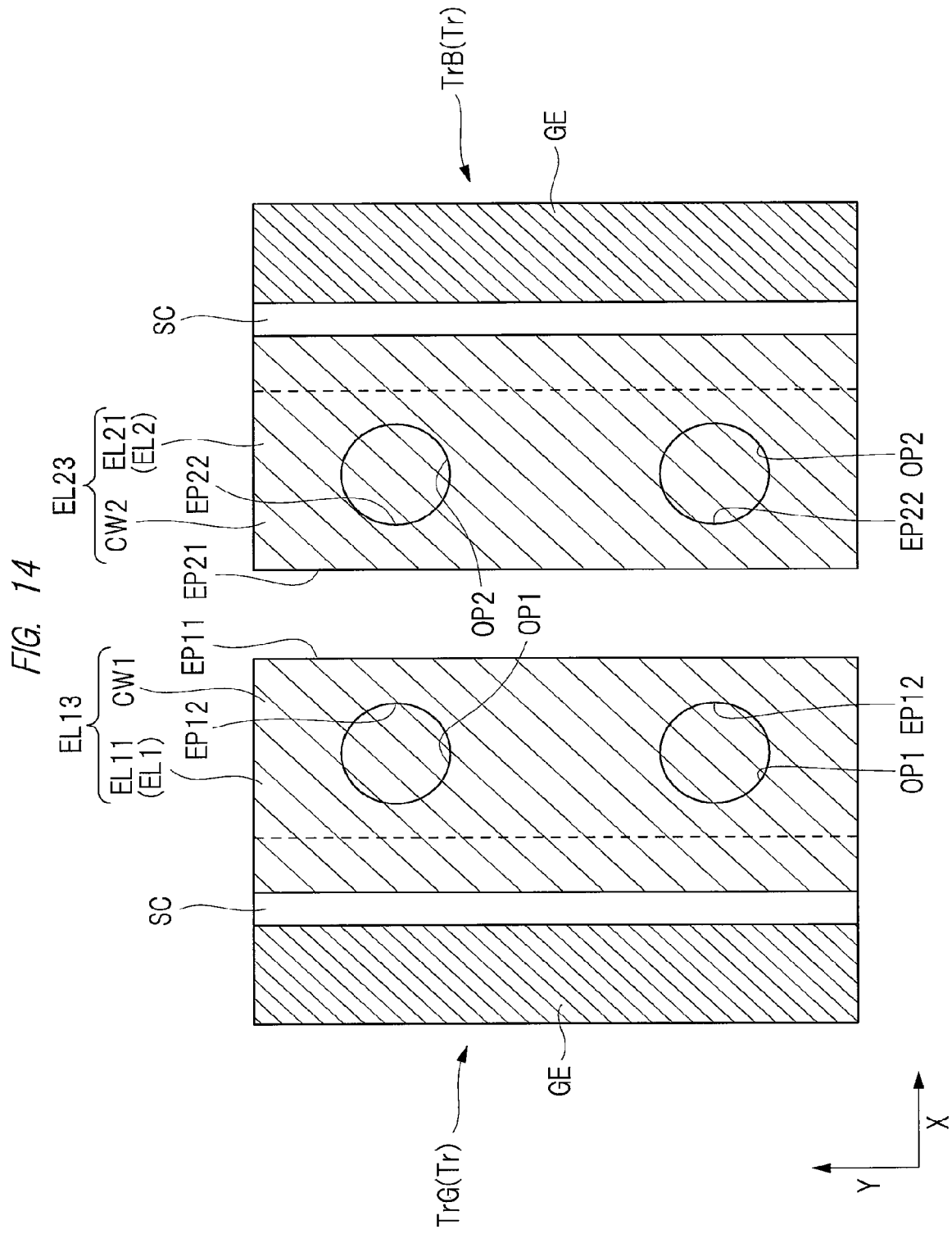
FIG. 14 is a plan view of transistors in a signal line switch circuit in the display device according to the first comparison example.
Figure 15:
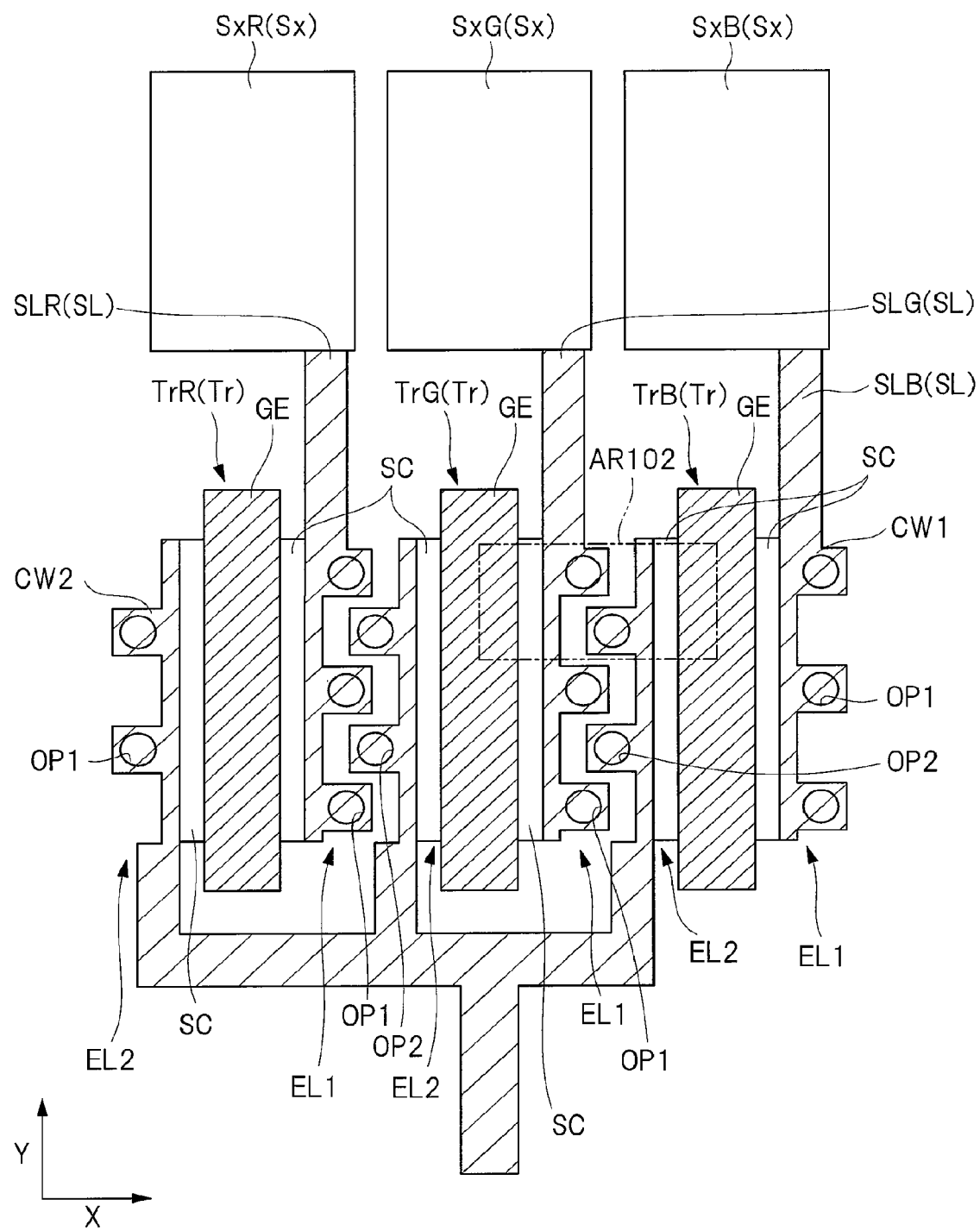
FIG. 15 is a plan view of transistors in a signal line switch circuit in the display device according to a second comparison example.
Figure 16:
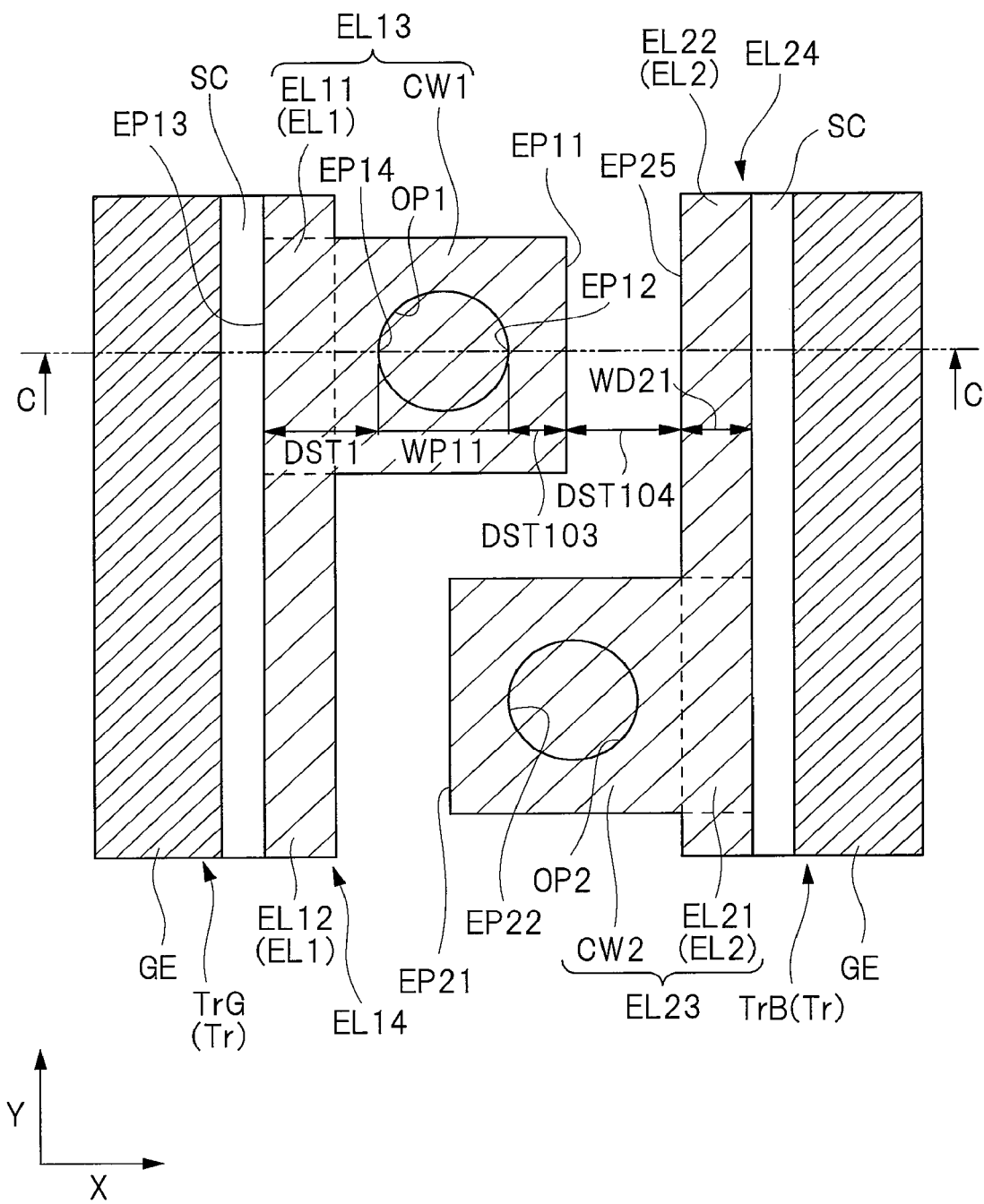
FIG. 16 is a plan view of transistors in a signal line switch circuit in the display device according to the second comparison example.
Figure 17:
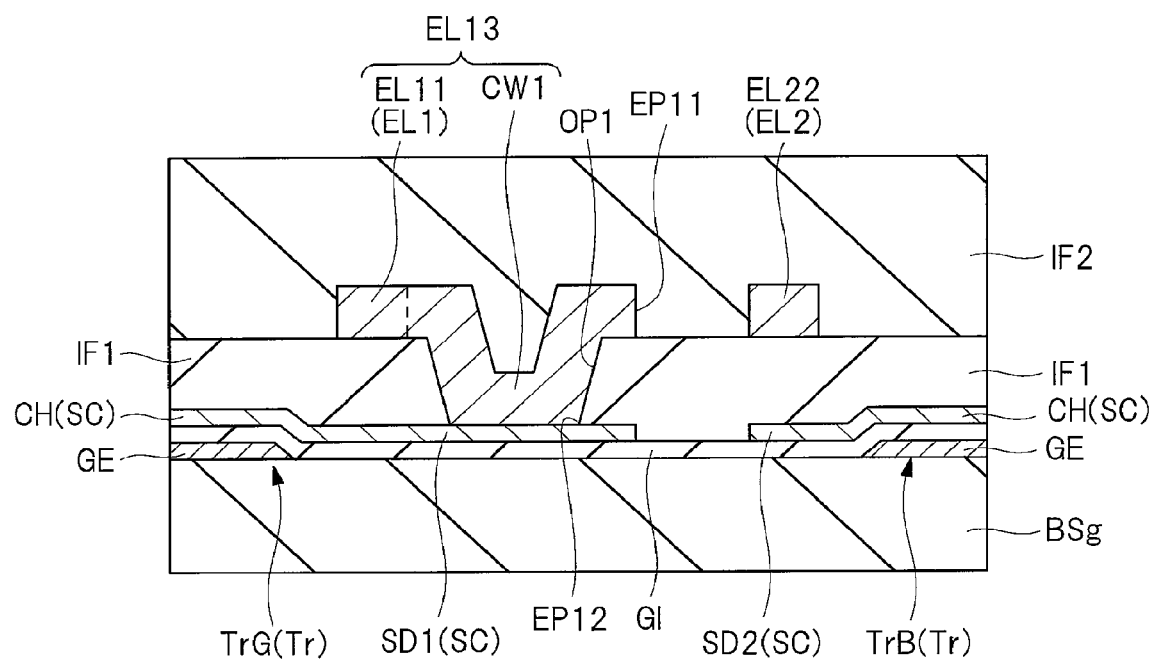
FIG. 17 is a cross-sectional view of transistors in a signal line switch circuit in the display device according to the second comparison example.

Then, a distance between the respective centers of transistors will be described below while referring to FIGS. 5 to 8, 12, and FIGS. 13 to 17 and comparing the embodiment, a comparative example 1, and a comparative example 2. FIGS. 13 and 14 are respectively plan views of transistors in a signal line switch circuit in a display device in the comparative example 1. FIGS. 15 and 16 are respectively plan views of transistors in a signal line switch circuit in a display device in the comparative example 2. FIG. 17 is a cross-sectional view of transistors in a signal line switch circuit in the display device in the comparative example 2. FIGS. 13 to 15 illustrate three signal lines and three transistors in an enlarged manner. FIG. 14 illustrates a region AR 101 surrounded by a two-dot and dash line illustrated in FIG. 13 in an enlarged manner, and FIG. 16 illustrates a region AR 102 surrounded by a two-dot and dash line illustrated in FIG. 15 in an enlarged manner. FIG. 17 is a cross-sectional view taken along a line C-C illustrated in FIG. 16. In FIG. 17, illustration of a portion above an insulating film IF2 is omitted.

In the comparative example 1, a connection wiring CW1 is integrally formed along a source-drain electrode EL1, and a connection wiring CW2 is integrally formed along a source-drain electrode EL2, as illustrated in FIGS. 13 and 14. Opening portions OP1 and opening portions OP2 are not alternately arranged in the Y-axis direction, and are arranged at the same position in the Y-axis direction.

In the comparative example 1, there is no clearance between an end portion EP11 of the connection wiring CW1 and an end portion EP12 of the opening portion OP1 in a plan view, and there is no clearance between an end portion EP21 of the connection wiring CW2 and an end portion EP22 of the opening portion OP2 in a plan view, as illustrated in FIGS. 13 and 14.

In an arrangement of transistors Tr in the comparative example, when a distance between a connection wiring CW1 and a connection wiring CW2 is reduced, a short circuit failure may occur between the source-drain electrode EL1 and the source-drain electrode EL2. Therefore, a distance between the connection wiring CW1 and the connection wiring CW2 is difficult to reduce.

That is, in the arrangement of the transistors Tr in the comparative example 1, a distance between the respective source-drain electrodes adjacent to each other in the two transistors Tr adjacent to each other in a gate length direction is difficult to reduce. Therefore, a plurality of transistors Tr including the two transistors Tr and arranged in the gate length direction cannot be closely arranged as a whole, and the area of a region around a display region cannot be reduced.

When the respective source-drain electrodes adjacent to each other in the two transistors Tr adjacent to each other in the gate length direction is coming closer to each other, a short circuit failure may occur between the source-drain electrodes adjacent to each other due to a difference in the shape of the source-drain electrode between manufacturing lots.

Alternatively, if a plurality of transistors, other than the transistors included in the signal line switch circuit, are provided in the region around the display region, the area of the region around the display region cannot be reduced, like the transistors included in the signal line switch circuit.

On the other hand, in the example illustrated in FIG. 12 in the present embodiment, the connection wiring CW1 is integrally formed along the source-drain electrode EL1, and the connection wiring CW2 is integrally formed along the source-drain electrode EL2. The opening portions OP1 and the opening portions OP2 are not alternately arranged in the Y-axis direction, and are arranged at the same position in the Y-axis direction.

However, in an example illustrated in FIG. 12, there is a clearance between the end portion EP11 of the connection wiring CW1 and the end portion EP12 of the opening portion OP1 in a plan view, and there is a clearance between the end portion EP21 of the connection wiring CW2 and the end portion EP22 of the opening portion OP2 in a plan view.

In such a case, the opening portion OP1 and the opening portion OP2 adjacent to each other in the X-axis direction can be brought closer to each other. Therefore, a distance in the X-axis direction between the source-drain electrode EL1 and the source-drain electrode EL2 can be reduced. Therefore, in the present embodiment, a distance between the green transistor TrG and the blue transistor TrB in the X-axis direction can be made smaller than that in the comparative example 1.

Also in the comparative example 2, an end portion EP11 of a connection wiring CW1 formed on an insulating film IF1 in a portion inside an opening portion OP1 and adjacent to the opening portion OP1 in a plan view exists outside the opening portion OP1 in a green transistor TrG, as illustrated in FIGS. 15 and 16, like in the comparative example 1. In a plan view, there is no clearance between the end portion EP11, on the side of a blue transistor TrB, of the connection wiring CW1 in the green transistor TrG and an end portion EP12, on the side of the blue transistor TrB, of the opening portion OP1 in the green transistor TrG.

The same holds for a positional relationship between an end portion EP21 of a connection wiring CW2 and an end portion EP22 of an opening portion OP2. That is, there is no clearance between the end portion EP21 of the connection wiring CW2 and the end portion EP22 of the opening portion OP2 in a plan view.

In the embodiment and the comparative example 2, an end, on the opposite side to the side of the blue transistor TrB, of the electrode section EL11 included in the source-drain electrode EL1 in the green transistor TrG is an end portion EP13, and an end, on the opposite side to the side of the blue transistor TrB, of the opening portion OP1 in the green transistor TrG is an end portion EP14. An end, on the side of the green transistor TrG, of the electrode section EL22 included in the source-drain electrode EL2 in the blue transistor TrB is an end portion EP25, as illustrated in FIGS. 7 and 16.

In the embodiment and the comparative example 2, a distance in the X-axis direction between the end portion EP13 of the electrode section EL11 and the end portion EP14 of the opening portion OP1 is a distance DST1, and a width in the X-axis direction of the opening portion OP1 is a width WP11. A width in the X-axis direction of the electrode section EL22 is a width WD21.

In the present embodiment, a distance in the X-axis direction between the end portion EP12 of the opening portion OP1 and the end portion EP25 of the electrode section EL22 included in the source-drain electrode EL2 in the blue transistor TrB is a distance DST2.

On the other hand, in the comparative example 2, a distance in the X-axis direction between the end portion EP12 of the opening portion OP1 and the end portion EP11 of the connection wiring CW1 is a distance DST103, and a distance in the X-axis direction between the end portion EP11 of the connection wiring CW1 and the end portion EP25 of the electrode section EL22 included in the source-drain electrode EL2 in the blue transistor TrB is a distance DST104.

In such a case, in the comparative example 2, a distance in the X-axis direction between the end portion EP12 of the opening portion OP1 and the end portion EP25 of the electrode section EL22 is equal to the sum of the distance DST103 and the distance DST104, and is larger than the distance DST104. The distance DST104 is difficult to set to a predetermined distance or less to prevent a short circuit between the connection wiring CW1 and the source-drain electrode E12, i.e., a short circuit between the source-drain electrode EL1 and the source-drain electrode EL2.

On the other hand, in the present embodiment, the distance DST2 in the X-axis direction between the end portion EP12 of the opening portion OP1 and the end portion EP25 of the electrode EL22 is smaller than the distance DST4 between the end portion EP11 of the connection wiring CW1 and the end portion EP25 of the electrode section EL22. While the distance DST4 is difficult to set to a predetermined distance or less to prevent a short circuit between the source-drain electrode EL1 and the source-drain electrode EL2, the distance DST2 can be made smaller than the distance DST4. A distance between the green transistor TrG and the blue transistor TrB in the X-axis direction depends on the distance DST2. Therefore, in the present embodiment, the distance between the green transistor TrG and the blue transistor TrB in the X-axis direction can be made smaller than that in the comparative example 2.

That is, in the present embodiment, the sum of the distance DST103 and the distance DST104 in the comparative example 2 can be replaced with the distance DST2. Thus, the distance between the green transistor TrG and the blue transistor TrB in the X-axis direction can be made smaller than that in the comparative example 2.

In the comparative example 2, the connection wiring CW1 and the connection wiring CW2 are adjacent to each other in the Y-axis direction, and a distance therebetween is too small. As a result, a parasitic capacitance therebetween increases so that a wiring resistance may increase. On the other hand, in the present embodiment, such a malfunction can be prevented.

In the present embodiment, a contact area between the connection wiring CW1 and the source-drain region SD1 becomes smaller than those in the comparative example 1 and the comparative example 2 so that a contact resistance between the connection wiring CW1 and the source-drain region SD1 may increase. However, a contact resistance between the connection wiring CW1 and the source-drain region SD1 is sufficiently lower than a resistance of the channel region CH included in the transistor Tr. Therefore, an increase in the contact resistance between the connection wiring CW1 and the source-drain region SD1 hardly affects an entire resistance between the source-drain electrode EL1 and the source-drain electrode EL2 included in the same transistor Tr.

Principal Feature and Effect of Present Embodiment

In the present embodiment, there is a clearance between the end portion EP11, on the side of the blue transistor TrB, of the connection wiring CW1 in the green transistor TrG and the end portion EP12, on the side of the blue transistor TrB, of the opening portion OP1 in the green transistor TrG in a plan view. That is, out of the two transistors Tr adjacent to each other in the gate length direction, there is a clearance between the end portion EP11, on the side of the one transistor Tr, of the connection wiring CW1 in the other transistor Tr and the end portion EP12, on the side of the one transistor Tr, of the opening portion OP1 in the other transistor Tr.

Thus, the distance between the two transistors Tr adjacent to each other in the gate length direction can be reduced, and an average value of respective distances between the centers of the two transistors Tr can be reduced. Therefore, the area of the frame region FLA, i.e., the area of the region around the display region can be reduced.

When the distance in the gate length direction between the transistors Tr included in the signal line switch circuit SW is large, for example, the transistors Tr need to be separately arranged in a plurality of regions adjacent to one another in the gate width direction, and the area of the region where the signal line switch circuit SW is arranged increases. According to the present embodiment, however, the distance in the gate length direction between the transistors Tr included in the signal line switch circuit SW can be reduced, and the transistors Tr need not be separately arranged in the plurality of regions adjacent to each other in the gate width direction. Therefore, the area of the frame region FLA can be reduced.

Thus, an arrangement of the transistors Tr in the present embodiment is an arrangement in which the distance between the source-drain electrodes adjacent to each other of the two transistors Tr adjacent to each other in the gate length direction can be reduced. Therefore, the plurality of transistors Tr including the two transistors Tr and arranged in the gate length direction can be closely arranged as a whole. The respective source-drain electrodes adjacent to each other in the two transistors Tr adjacent to each other in the gate length direction are spaced apart from each other. Thus, a short circuit failure can be prevented or inhibited from occurring between the source-drain electrodes adjacent to each other due to a difference in the shape of the source-drain electrode between manufacturing lots.

In the present embodiment, an example in which an arrangement in which a clearance is provided between the end portion of the connection wiring in one of the two transistors Tr adjacent to each other in the gate length direction and the end, on the side of the other transistor, of the opening portion is applied to an arrangement of the two transistors Tr included in the signal line switch circuit SW has been described.

However, a transistor other than the transistors included in the signal line switch circuit may be used. For example, the present embodiment of the invention may be applied to transistors in the scanning line driving circuit CG. That is, in one of two transistors adjacent to each other in a gate length direction in a frame region, a clearance may be provided between an end portion of a connection wiring on the side of the other transistor in the one transistor and an end portion of an opening portion in the other transistor. In such a case, the area of the frame region can also be reduced.

Modification to Present Embodiment

Figure 18:
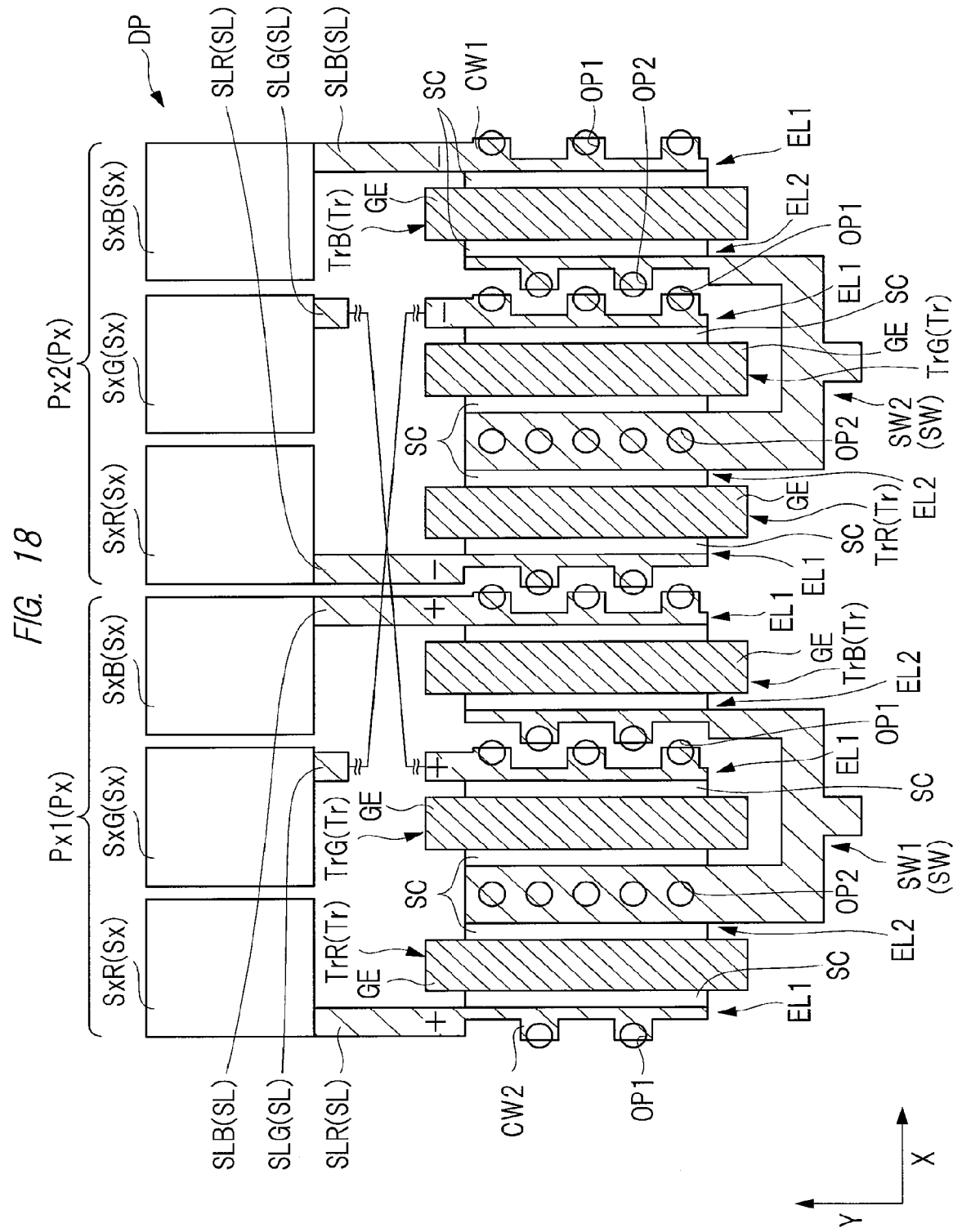
FIG. 18 is a plan view of transistors in a signal line switch circuit in a display device in a modification to the embodiment.

A modification to the present invention will be described below. FIG. 18 is a plan view of transistors in a signal line switch circuit in a display device in a modification to the present embodiment.

In the modification, between a sub-pixel included in a given pixel and a sub-pixel included in another pixel, signal line switch circuits each including transistors connected to the sub-pixels are replaced with each other. That is, the order in arrangement of the sub-pixels in the X-axis direction and the order in arrangement of the transistors in the X-axis direction included in the signal line switch circuit do not correspond to each other, and are replaced with each other.

As illustrated in FIG. 18, a pixel Px2 as a first pixel and a pixel Px1 as a second pixel are formed in a display section DP in the modification, unlike in the embodiment. Each of the pixel Px1 and the pixel Px2 includes a red sub-pixel SxR, a green sub-pixel SxG, and a blue sub-pixel SxB as sub-pixels Sx respectively having different colors.

A green transistor (first transistor) TrG included in the signal line switch circuit SW1 is connected to the green sub-pixel (first sub-pixel) SxG included in the pixel Px2. That is, the green transistor TrG included in the signal line switch circuit SW1 is a transistor that drives the green sub-pixel SxG included in the pixel Px2. That is, the pixel to which the green transistor TrG included in the signal line switch circuit SW1 is connected differs from that illustrated in FIG. 5.

A blue transistor (second transistor) TrB included in the signal line switch circuit SW1 is connected to the blue sub-pixel (second sub-pixel) SxB included in the pixel Px1. That is, the blue transistor TrB included in the signal line switch circuit SW1 is a transistor that drives the blue sub-pixel SxB included in the pixel Px1. That is, the two transistors, which are controlled by the same signal line switch circuit, have a relationship in which they respectively drive the sub-pixels in the different pixels.

In the modification, when the green sub-pixel SxG included in the pixel Px2 is driven, signals having the same polarity are respectively fed to the green transistor TrG and the blue transistor TrB included in the signal line switch circuit SW1. Signals having the same polarity are respectively fed to the green sub-pixel SxG included in the pixel Px2 and the blue sub-pixel SxB included in the pixel Px1.

A signal having the same polarity as that of the signals respectively fed to the green transistor TrG and the blue transistor TrB included in the signal line switch circuit SW1 is fed to a red transistor TrR included in the signal line switch circuit SW1. A signal having the same polarity as that of the signals respectively fed to the green sub-pixel SxG included in the pixel Px2 and the blue sub-pixel SxB included in the pixel Px1 is also fed to the red sub-pixel SxR included in the pixel Px1.

On the other hand, a signal having an opposite polarity to that of the signal fed to the signal line switch circuit SW1 is fed to the red transistor TrR, the green transistor TrG, and the blue transistor TrB included in the signal line switch circuit SW2. A signal having an opposite polarity to that of the signal fed to the sub-pixels in the colors included in the pixel Px1 is fed to the sub-pixels in the colors included in the pixel Px2. The green transistor TrG included in the signal line switch circuit SW2 is connected to the green sub-pixel SxG included in the pixel Px1.

In the embodiment illustrated in FIG. 5, the transistors Tr included in the signal line switch circuit SW have a relationship in which they are driven in a time-divisional manner. A signal having a positive polarity and a signal having a negative polarity are sequentially alternately fed in the X-axis direction to the plurality of sub-pixels Sx arranged in the X-axis direction. When the signals are sequentially fed to the red transistor TrR, the green transistor TrG, and the blue transistor TrB included in the same signal line switch circuit, therefore, the polarity of the signal fed from the signal line driving circuit CS (see FIG. 4) needs to be alternately reversed to a positive polarity, a negative polarity, and a positive polarity, for example. Accordingly, the power consumption of the display device may increase.

Even in the modification illustrated in FIG. 18, signals having the same polarity are sequentially fed to the red transistor TrR, the green transistor TrG, and the blue transistor TrB included in the same signal line switch circuit. However, in the case, signal lines (green signal lines SLG in FIG. 18) between the adjacent pixels intersect each other. That is, the green transistor TrG in the signal line switch circuit SW1 is connected to the pixel Px2. Thus, the polarity of the signal fed from the signal line driving circuit CS (see FIG. 4) need not be reversed. Therefore, the power consumption of the display device can be reduced.

In the modification, an example in which between the sub-pixel included in the given pixel and the sub-pixel included in the other pixel, the signal line switch circuits each including the transistors connected to the sub-pixels are replaced with each other has been described. However, not only between the different pixels but also between the given sub-pixel and the other sub-pixel in the same pixel, the transistors respectively connected to the sub-pixels may be replaced with each other. For example, when the sub-pixel and the transistor included in the signal line switch circuit are connected to each other, the signal lines may be made to intersect each other, for example, to reduce an overlap amount between some of wirings. Such an arrangement can be easily coped with by replacing the transistor connected to the sub-pixel between the sub-pixel and the other sub-pixel.

In the foregoing, the invention made by the present inventors has been concretely described based on the embodiments. However, it is needless to say that the present invention is not limited to the foregoing embodiments and various modifications and alterations can be made within the scope of the present invention.

In the above-described embodiments, the case of the liquid crystal display apparatus has been exemplified as the disclosure example. However, as another application example, various types of flat-panel display apparatuses such as an organic EL display apparatus, other self-luminous type display apparatus, and an electronic-paper type display apparatus having an electrophoretic element can be exemplified. And, it is needless to say that the present invention is applicable to display apparatuses ranging from small- or middle-sized one to large one without any particular limitation.

In the scope of the idea of the present invention, various modified examples and alteration examples could have been easily thought up by those who skilled in the art, and it would be understood that these various modified examples and alteration examples belong to the scope of the present invention.

For example, the ones obtained by appropriate addition, removal, or design-change of the components to/from/into each of the above-described embodiments by those who skilled in the art or by addition, omitting, or condition-change of the step to/from/into each of the above-described embodiments are also within the scope of the present invention as long as they include the concept of the present invention.

The present invention is effectively applied to a display apparatus.

The invention claimed is:

1. A display device comprising:
  a substrate;
  a pixel circuit having pixels formed therein;
  a plurality of control circuits that respectively feed signals relating to an image to the pixel circuit; and
  a plurality of transistors in a control circuit;
  wherein the plurality of transistors includes:
    a gate line extending in a first direction;
    an insulating film with an opening portion;
    a drain electrode and a source electrode arranged in a second direction different from the first direction;
    a semiconductor film overlapped with the drain electrode, the source electrode, and the gate line with the insulating film interposed therebetween; and
    a conductive wiring that electrically connects the semiconductor film and the source electrode or the drain electrode via the opening portion,
  the plurality of transistors includes a first transistor and a second transistor,
  the first transistor and the second transistor are adjacent to each other in the second direction, and
  there is a clearance between an end of the conductive wiring in the first transistor on a side of the second transistor and an end of the opening portion in the first transistor on the side of the second transistor.

2. The display apparatus according to claim 1,
  wherein the first transistor includes a first opening portion group arranged on the side closer to the second transistor than the gate line of the first transistor,
  the second transistor includes a second opening portion group arranged on the side closer to the first transistor than the gate line of the second transistor,
  the first opening portion group has a plurality of first opening portions,
  the second opening portion group has a plurality of second opening portions, and
  the plurality of first opening portions and the plurality of second opening portions are alternately arranged in the first direction.

3. The display apparatus according to claim 1,
  wherein one of the source electrode and the drain electrode in the first transistor and one of the source electrode and the drain electrode in the second transistor are adjacent to each other in the second direction, and do not overlap each other in the first direction.

4. The display apparatus according to claim 2,
  wherein one of the source electrode and the drain electrode in the first transistor and one of the source electrode and the drain electrode in the second transistor are adjacent to each other in the second direction, and do not overlap each other in the first direction.

5. The display apparatus according to claim 1,
  wherein the first transistor includes a first opening portion group arranged on the side closer to the second transistor than the gate line of the first transistor,
  the second transistor includes a second opening portion group arranged on the side closer to the first transistor than the gate line of the second transistor,
  the first opening portion group has a plurality of first opening portions,
  the second opening portion group has a plurality of second opening portions,
  the plurality of first opening portions are arranged in the first direction in the first transistor,
  the plurality of second opening portions are arranged in the first direction in the second transistor, and
  the plurality of first opening portions and the plurality of second opening portion overlap each other in the first direction.

6. The display apparatus according to claim 1,
  wherein the pixel includes a first sub-pixel and a second sub-pixel having different colors, respectively,
  the first transistor is a transistor that drives the first sub-pixel,
  the second transistor is a transistor that drives the second sub-pixel, and
  the first sub-pixel and the second sub-pixel are arranged in the second direction.

7. The display apparatus according to claim 2,
  wherein the pixel includes a first sub-pixel and a second sub-pixel having different colors, respectively,
  the first transistor is a transistor that drives the first sub-pixel,
  the second transistor is a transistor that drives the second sub-pixel, and
  the first sub-pixel and the second sub-pixel are arranged in the second direction.

8. The display apparatus according to claim 3,
  wherein the pixel includes a first sub-pixel and a second sub-pixel having different colors, respectively,
  the first transistor is a transistor that drives the first sub-pixel,
  the second transistor is a transistor that drives the second sub-pixel, and
  the first sub-pixel and the second sub-pixel are arranged in the second direction.

9. The display apparatus according to claim 5,
  wherein the pixel includes a first sub-pixel and a second sub-pixel having different colors, respectively,
  the first transistor is a transistor that drives the first sub-pixel,
  the second transistor is a transistor that drives the second sub-pixel, and
  the first sub-pixel and the second sub-pixel are arranged in the second direction.

10. The display apparatus according to claim 1,
  wherein the pixel circuit has a first pixel and a second pixel as the pixels formed therein,
  the first pixel includes a first sub-pixel,
  the second pixel includes a second sub-pixel,
  the first transistor is a transistor that drives the first sub-pixel, the second transistor is a transistor that drives the second sub-pixel,
the first sub-pixel and the second sub-pixel have different colors, respectively, and
the first transistor and the second transistor are controlled by the same control circuit.

11. The display apparatus according to claim 2,
wherein the pixel circuit has a first pixel and a second pixel as the pixels formed therein,
the first pixel includes a first sub-pixel,
the second pixel includes a second sub-pixel,
the first transistor is a transistor that drives the first sub-pixel,
the second transistor is a transistor that drives the second sub-pixel,
the first sub-pixel and the second sub-pixel have different colors, respectively, and
the first transistor and the second transistor are controlled by the same control circuit.

12. The display apparatus according to claim 3,
wherein the pixel circuit has a first pixel and a second pixel as the pixels formed therein,
the first pixel includes a first sub-pixel,
the second pixel includes a second sub-pixel,
the first transistor is a transistor that drives the first sub-pixel,
the second transistor is a transistor that drives the second sub-pixel,
the first sub-pixel and the second sub-pixel have different colors, respectively, and
the first transistor and the second transistor are controlled by the same control circuit.

13. The display apparatus according to claim 5,
wherein the pixel circuit has a first pixel and a second pixel as the pixels formed therein,
the first pixel includes a first sub-pixel,
the second pixel includes a second sub-pixel,
the first transistor is a transistor that drives the first sub-pixel,
the second transistor is a transistor that drives the second sub-pixel,
the first sub-pixel and the second sub-pixel have different colors, respectively, and
the first transistor and the second transistor are controlled by the same control circuit.

14. The display apparatus according to claim 1,
wherein the plurality of transistors includes a third transistor as the transistor,
the third transistor is arranged on the opposite side to the second transistor with the first transistor sandwiched therebetween,
the drain electrode in the first transistor and one of the source electrode and the drain electrode in the second transistor are adjacent to each other in the second direction, and
a source electrode in the third transistor is shared with the source electrode in the first transistor.

15. The display apparatus according to claim 14,
wherein the first transistor includes a first opening portion group arranged on the side closer to the second transistor than the gate line of the first transistor,
the second transistor includes a second opening portion group arranged on the side closer to the first transistor than the gate line of the second transistor,
the first transistor and the third transistor have a common third opening portion group arranged between the gate line in the first transistor and the gate line in the third transistor,
the first opening portion group has a plurality of first opening portions,
the second opening portion group has a plurality of second opening portions,
the third opening portion group has a plurality of third opening portions,
the plurality of first opening portion are arranged in the first direction in the first transistor,
the plurality of second opening are arranged in the first direction in the second transistor,
the plurality of first opening portions and the plurality of second opening portions are alternately arranged in the first direction, and
the plurality of third opening portions are arranged in the first direction.

16. The display apparatus according to claim 1,
wherein one of the drain electrode and the source electrode in the first transistor and one of the drain electrode and the source electrode in the second transistor are adjacent to each other,
the first transistor has a plurality of opening portions arranged on the side of the second transistor with respect to the gate line in the first transistor, and
the opening portions in the first transistor and the drain electrode or the source electrode in the second transistor are spaced apart from each other in a plan view.

17. The display apparatus according to claim 2,
wherein one of the drain electrode and the source electrode in the first transistor and one of the drain electrode and the source electrode in the second transistor are adjacent to each other,
the first transistor has the plurality of first opening portions arranged on the side of the second transistor with respect to the gate line in the first transistor, and
the plurality of first opening portions in the first transistor and the drain electrode or the source electrode in the second transistor are spaced apart from each other in a plan view.

18. The display apparatus according to claim 5,
wherein one of the drain electrode and the source electrode in the first transistor and one of the drain electrode and the source electrode in the second transistor are adjacent to each other,
the first transistor has the plurality of first opening portions arranged on the side of the second transistor with respect to the gate line in the first transistor, and
the plurality of first opening portions in the first transistor and the drain electrode or the source electrode in the second transistor are spaced apart from each other in a plan view.

* * * * *